United States Patent [19]

Stolarczykz

[11] Patent Number: 5,066,917
[45] Date of Patent: Nov. 19, 1991

[54] LONG FEATURE VERTICAL OR HORIZONTAL ELECTRICAL CONDUCTOR DETECTION METHODOLOGY USING PHASE COHERENT ELECTROMAGNETIC INSTRUMENTATION

[75] Inventor: Larry G. Stolarczyk, Raton, N. Mex. Mex.

[73] Assignee: Stolar, Inc., Raton, N. Mex.

[21] Appl. No.: 466,494

[22] Filed: Jan. 17, 1990

[51] Int. Cl.$^5$ .......... G01V 3/12; G01V 3/08; G01V 3/30; G01V 3/26
[52] U.S. Cl. .................. 324/338; 324/334; 324/335; 324/339
[58] Field of Search ........... 324/326, 334, 335, 337, 324/338, 339, 343

[56] References Cited

U.S. PATENT DOCUMENTS

| Re. 32,563 | 12/1987 | Stolarczyk | 324/338 X |
|---|---|---|---|
| 1,676,779 | 7/1928 | Herr | 324/334 |
| 3,065,408 | 11/1962 | Marsh | 324/334 |
| 3,168,694 | 2/1965 | Slattery | 324/334 |
| 3,187,252 | 6/1965 | Hungerford | 324/343 |
| 3,286,163 | 11/1966 | Holser et al. | 324/338 |
| 3,609,522 | 9/1971 | Hutchins et al. | 324/334 |
| 3,690,164 | 9/1972 | Gabillard et al. | 324/338 X |
| 3,936,728 | 2/1976 | Ghosh et al. | 324/335 |
| 3,984,758 | 10/1976 | Millon | 324/338 |
| 4,045,724 | 8/1977 | Shuck et al. | 324/338 |
| 4,161,687 | 7/1979 | Lytle et al. | 324/338 |
| 4,258,321 | 3/1981 | Neale, Jr. | 324/334 |
| 4,290,020 | 9/1981 | Hansen et al. | 324/334 |
| 4,393,350 | 7/1983 | Hansen et al. | 324/334 |
| 4,507,611 | 3/1985 | Helms | 324/334 X |
| 4,542,344 | 9/1985 | Darilek et al. | 324/326 |
| 4,577,153 | 3/1986 | Stolarczyk | 324/334 |
| 4,636,731 | 1/1987 | Savage et al. | 324/343 X |
| 4,691,166 | 9/1987 | Stolarczyk | 324/338 X |

FOREIGN PATENT DOCUMENTS 89722 3/1972 Canada .................. 324/334

OTHER PUBLICATIONS

Hansen, R. C., Radiation and Reception With Buried and Submerged Antennas, IEEE Trans. on Ant. and Prop. (5/63).
Moore, R. K., Effects of Surrounding Conducting Medium on Antenna Analysis, IEEE Trans. on Ant. Prop. (5/63).

(List continued on next page.)

Primary Examiner—Gerard R. Strecker
Attorney, Agent, or Firm—Thomas E. Schatzel

[57] ABSTRACT

A method utilized with an underground conductor detection system for calibrating a downhole transmitter to compensate for detuning of the transmitter antenna by geologic formations. The method comprises sending a synchronization signal to the transmtter antenna, measuring the current flow through the transmitter antenna and adjusting the current to a constant level, and measuring the phase difference between the transmitter antenna current and the synchronization signal. A receiver transmitter is calibrated by sending a synchronization signal to a radiating antenna in the receiver that in turn sends a calibration signal to the receiver antenna that is directed over the entire signal pathway back to surface located signal processing equipment. Another method of underground conductor detection sends a surface wave to the downhole receier to cancel the effect of the surface wave modulation on a target wave being radiated by the underground detector. Another method of underground conductor detection utilizes a receiver tuned loop antenna oriented orthogonal to the magnetic dipole of the transmitter antenna for discriminating against reception of a primary wave. Another method of detecting anomalous geological zones such as tunnels, utilizes a low to medium frequency tomographic scan to cancel the effect of geological conductivity noise in a high to very high frequency tomographic scan of a region suspected of containing ther anomalous geological zone.

9 Claims, 8 Drawing Sheets

OTHER PUBLICATIONS

J. R. Wait & D. A. Hill, Coaxial and Bifilar Modes on a Transmission Line in a Circular Tunnel, Preliminary Report to U.S. Bureau of Mines on Contract No. H0122061 (9/74).

R. N. Grubb et al., Borehole Measurements of Conductivity and Dielectric Constant in the 300 kHz to 25 MHz Frequency Range, Radio Science, vol. II, No. 4 (4/76).

J. R. Wait, The Magnetic Dipole Antenna Immersed in a Conducting Medium, Proceeding of the IRE (10/52).

J. R. Wait, Electromagnetic Fields of Source in Lossy Media, published in Antenna Theory (R. E. Collins & F. J. Zucker, editors), McGraw-Hill Book Co., pp. 438–451.

R. F. Harrington, Time Harmonic Electromagnetic Fields, McGraw-Hill, N.Y., pp. 232–236 (1961).

P. F. Panter, Modulation, Noise, and Spectral Analysis Applied to Information Transmission, McGraw-Hill Book Co., pp. 461–505 (1965).

R. J. Lytle et al., Cross-borehole Electromagnetic Probing to Locate High Contrast Anomalies, Geophysics, vol. 44, pp. 1667–1676 (Oct. 1979).

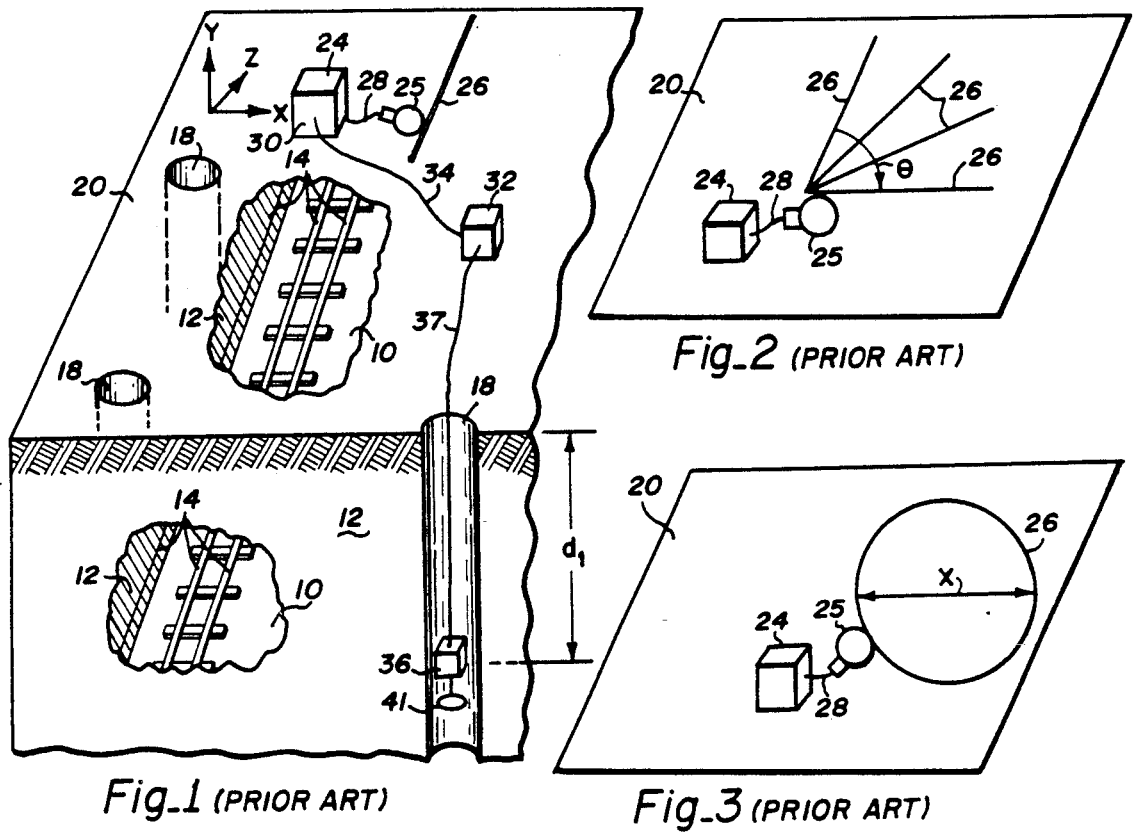
Fig_1 (PRIOR ART)
Fig_2 (PRIOR ART)
Fig_3 (PRIOR ART)
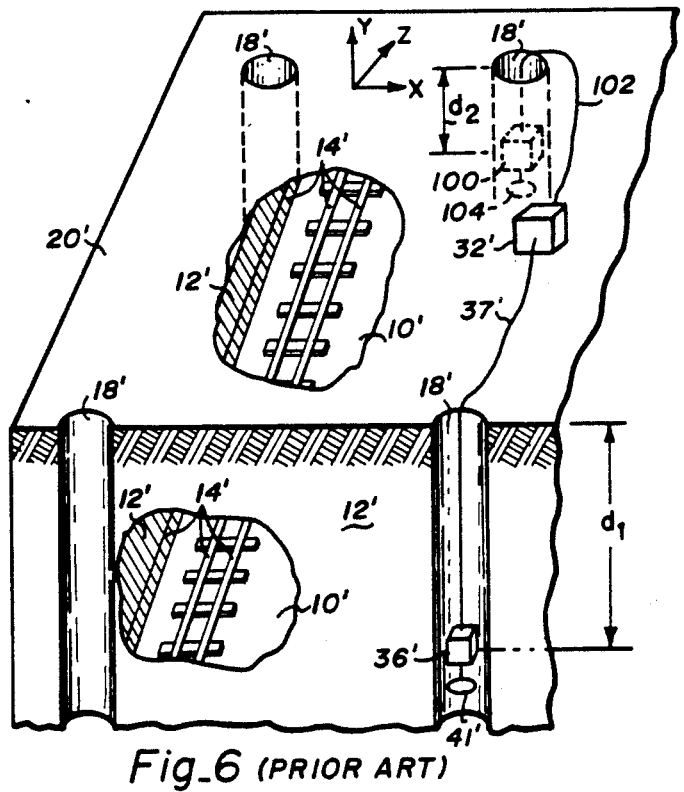
Fig_6 (PRIOR ART)

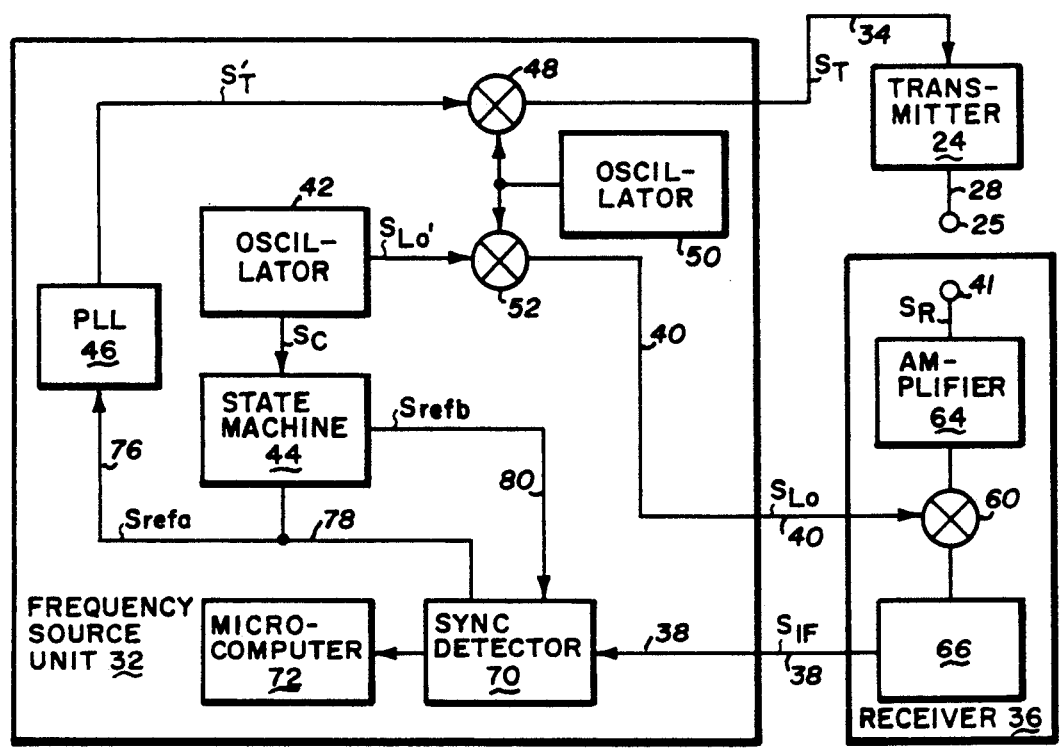
*Fig_4* (PRIOR ART)
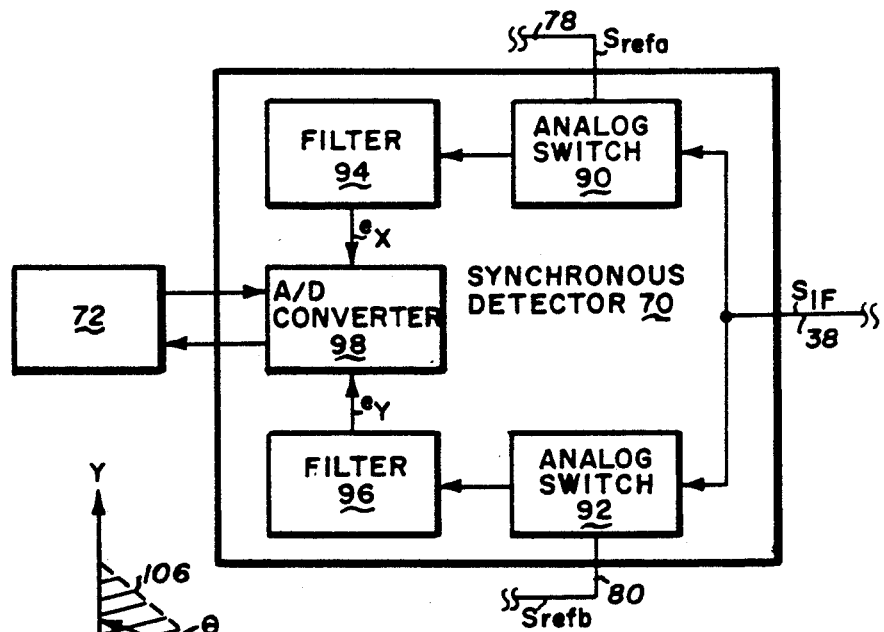
*Fig_5* (PRIOR ART)
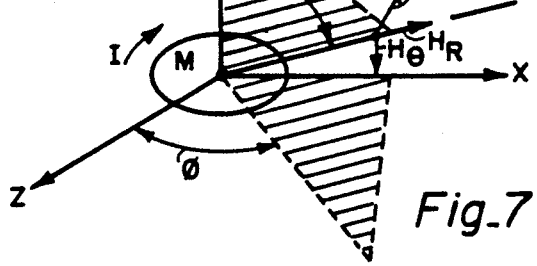
*Fig_7* (PRIOR ART)

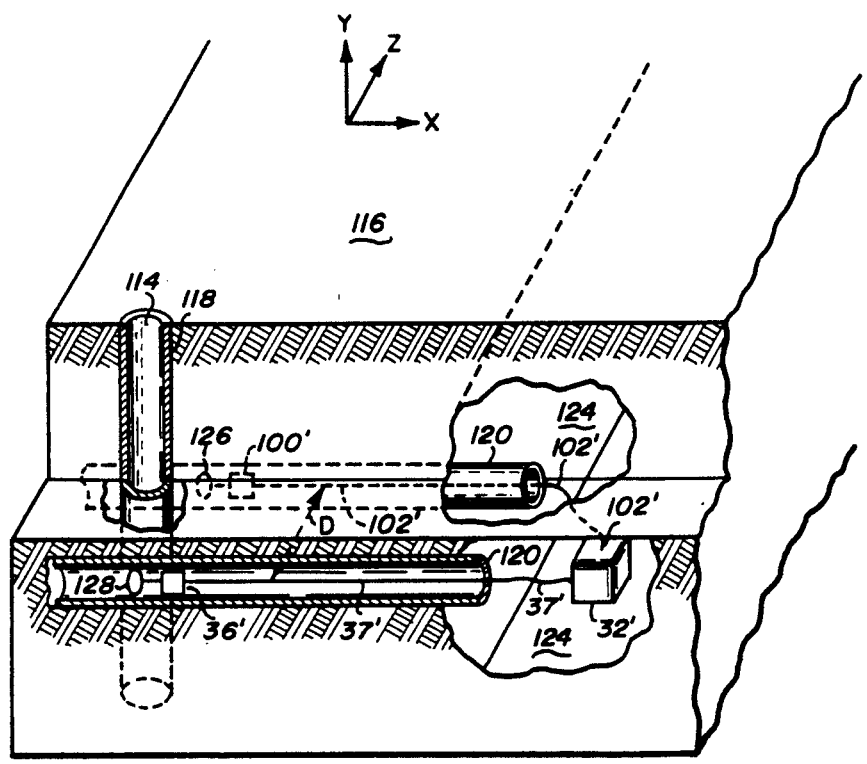
Fig_10 (PRIOR ART)
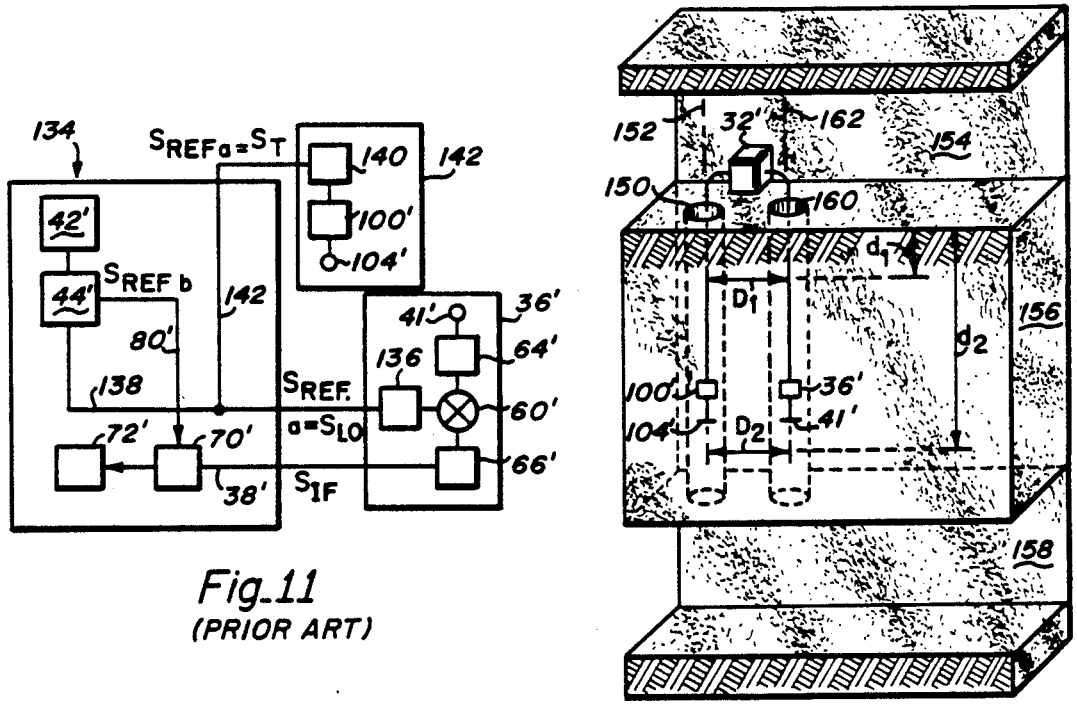
Fig_11 (PRIOR ART)
Fig_12 (PRIOR ART)

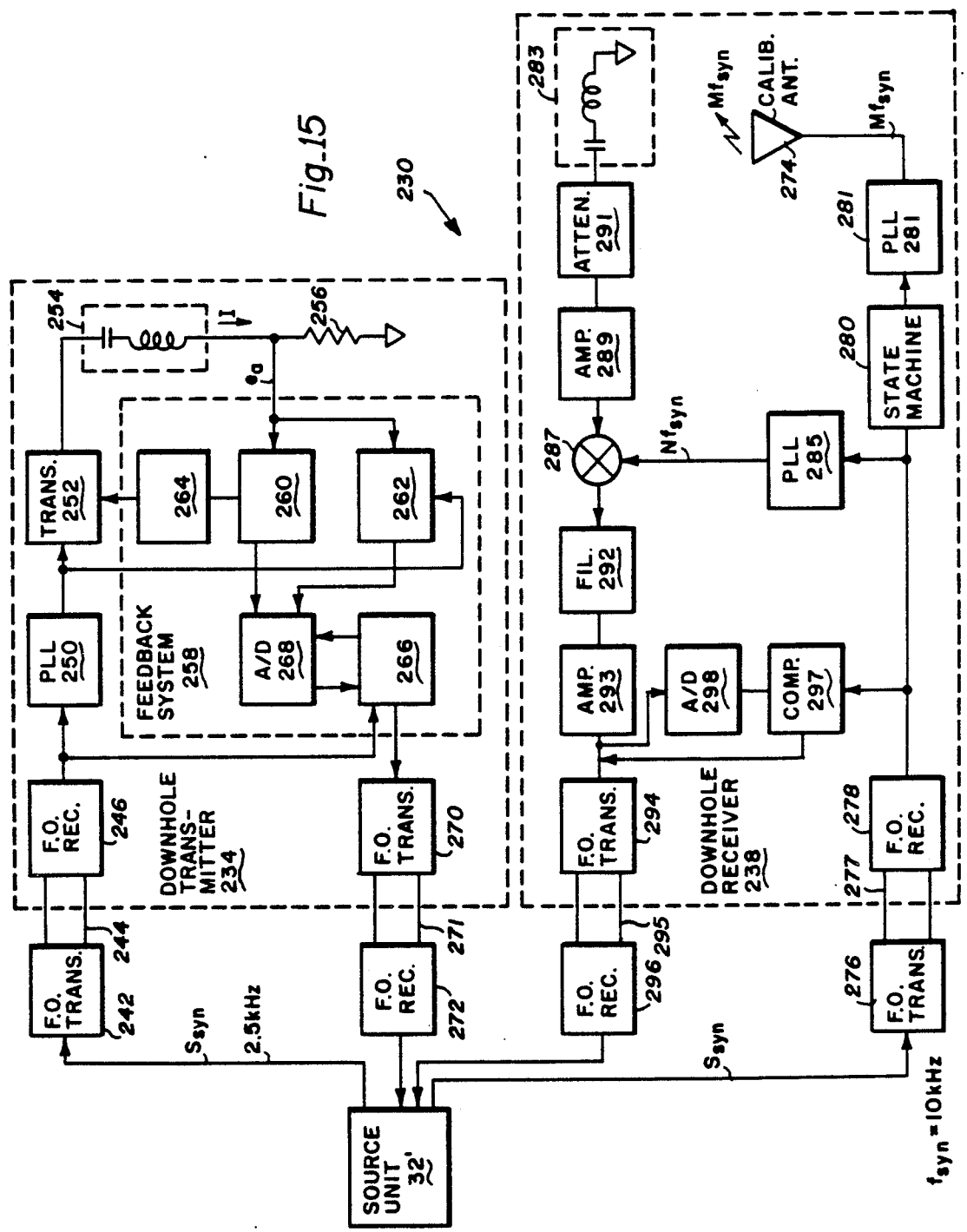

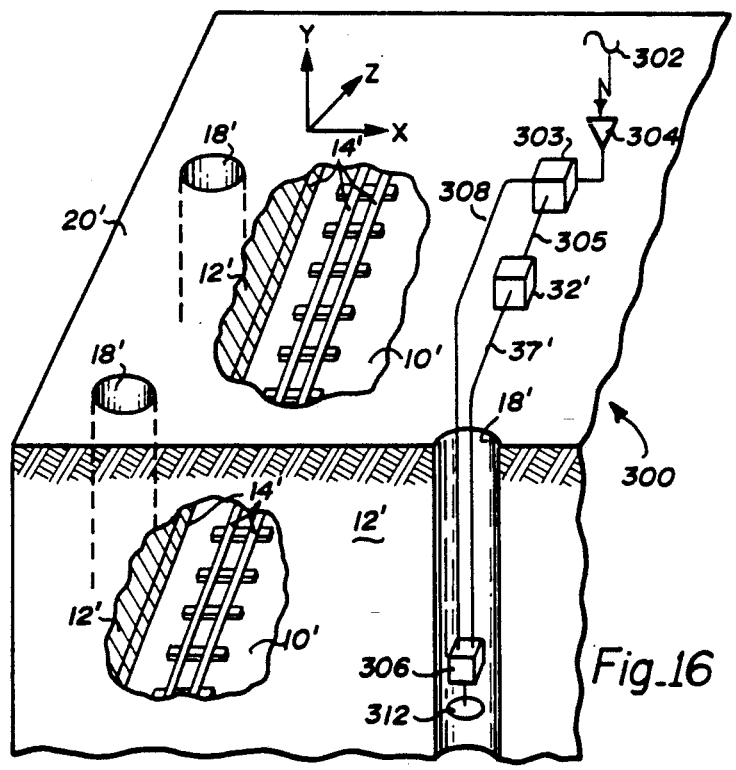
Fig_16
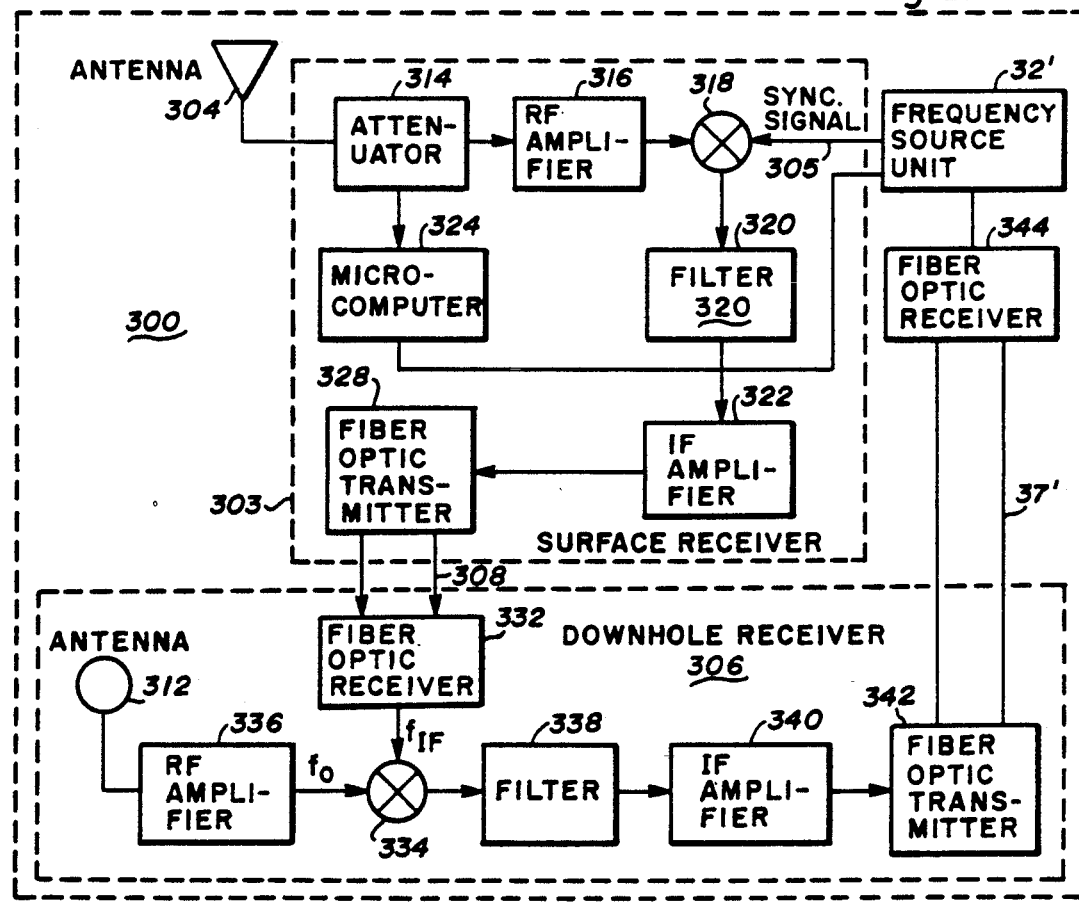
Fig_17

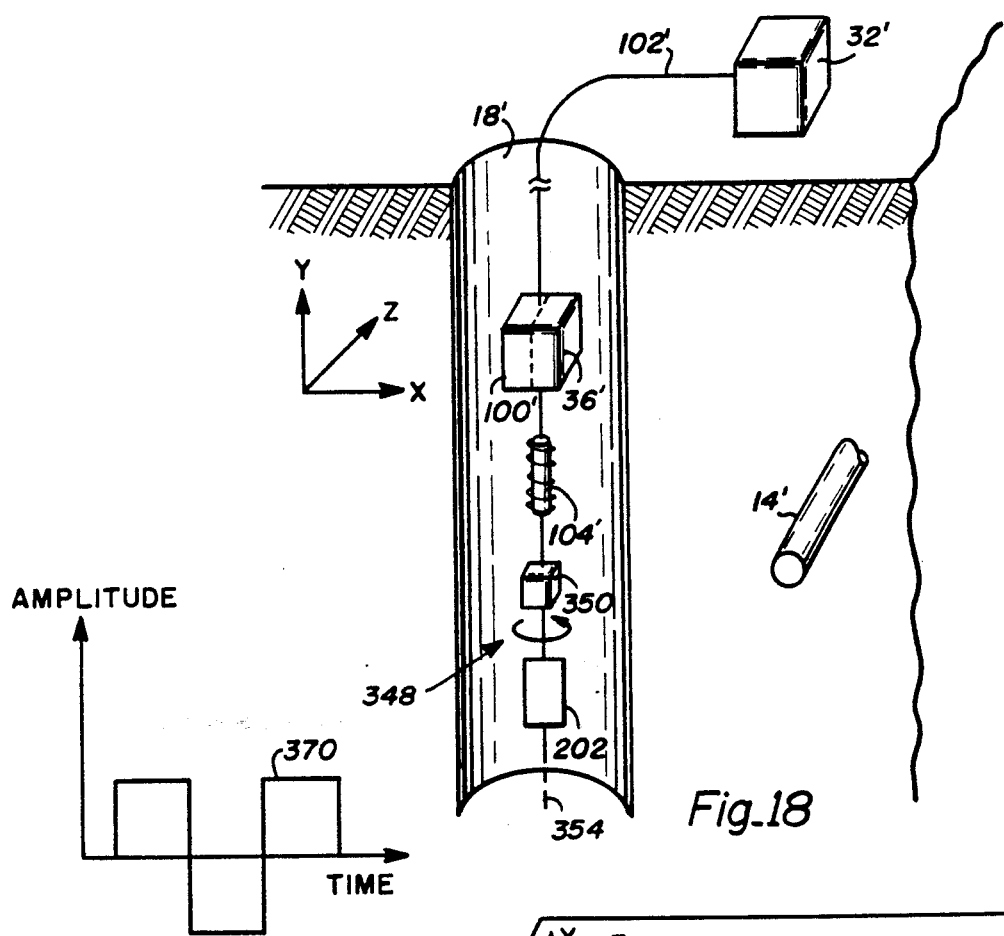
Fig.18
Fig.20
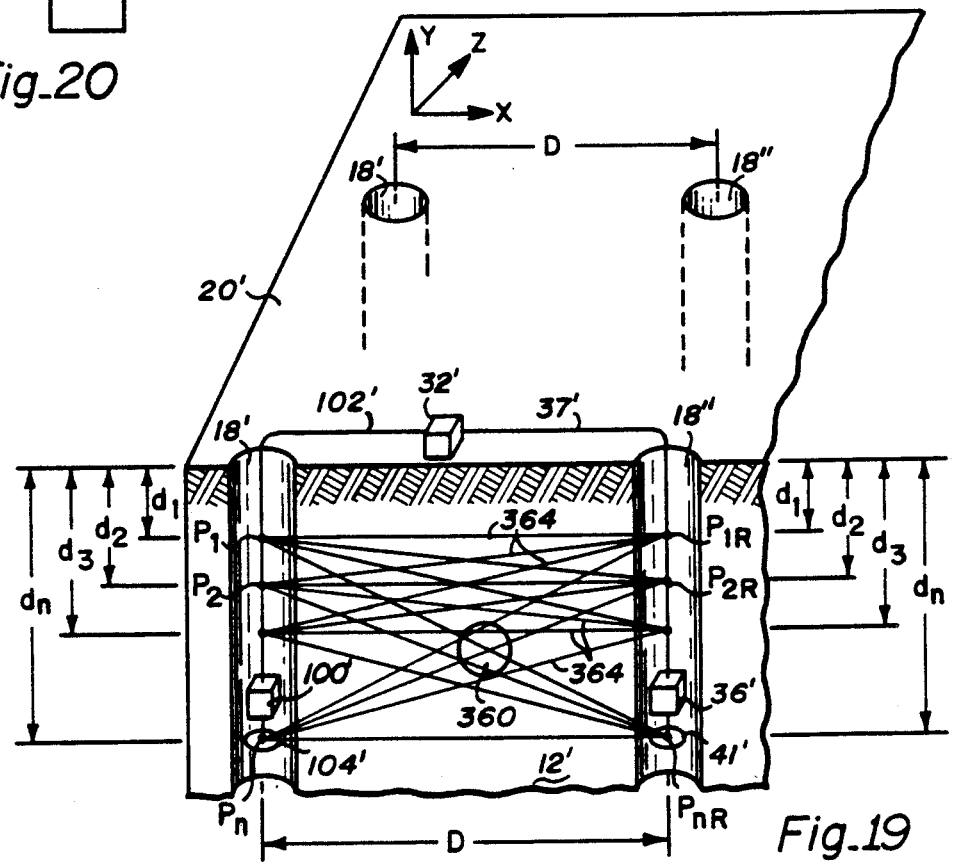
Fig.19

LONG FEATURE VERTICAL OR HORIZONTAL ELECTRICAL CONDUCTOR DETECTION METHODOLOGY USING PHASE COHERENT ELECTROMAGNETIC INSTRUMENTATION

BACKGROUND OF THE INVENTION

1. Field of the Invention

The present invention relates generally to an improved method and apparatus for detecting underground electrical conductors surrounded by less electrically conducting rock and more particularly to a method for detecting ore veins or electrically conducting equipment located in underground tunnels or boreholes.

2. Description of the Prior Art

Several techniques are currently used in military operations to detect underground tunnels. These include visual observation of surface features, surface drilling, use of accoustical and seismic systems and the deployment of various surface and downhole electromagnetic (EM) wave propagation methods.

Of these techniques, the EM techniques are the most promising because they are less sensitive to munition firings and can be made less sensitive to random geologic structure noise. Two EM techniques presently in use are a cross-hole high frequency diffraction detection method claimed in U.S. Pat. No. 4,161,687, issued to Lytle, et al. and a cross-hole pulsed EM system (PEMSS-II) developed by the Southwest Research Institute and currently used by the U.S. and South Korean Armies.

R. J. Lytle, et al., in "Cross-borehole Electromagnetic Probing to Locate High Contrast Anomalies"; Geophysics, Vol. 44, pp. 1667-1676 (October 1979), discloses a theoretical basis for detecting tunnels by diffraction scanning.

All of these cross-hole techniques are designed to detect changes in the electrical parameters of the geologic medium caused by the tunnel intersection with a vertical plane between two drillholes. However, these techniques utilize downhole transmitting and receiving antennas that are connected to surface equipment by electrically conductive cable. This use of electrically conductive cable interferes with magnitude and phase shift measurements and prevents the reliable use of synchronous detection techniques.

In general, use of antennas and electromagnetic wave propagation methods in slightly conducting natural rock for remote sensing and mapping of subsurface geologic features, for applications in hardened military communications, and radio communications with miners working or trapped in underground tunnels has been reported in the literature. The subject area has been investigated for communications with submerged submarines. Review papers, Hansen, R. C., "Radiation and Reception With Buried and Submerged Antennas," IEEE Trans. on Ant. and Prop.; May 1963; and Moore, R. K., "Effects of Surrounding Conducting Medium on Antenna Analysis", IEEE Trans. on Ant. and Prop.; May 1963, trace the historical development of the canonical theory from its late 18th century beginning with Heaviside, O., "Electrical Papers", Vols. I and II, MacMillan and Company, Ltd., London, England 1882. The theoretical problem considered the interaction of antennas and EM field components with slightly conducting geologic medium. For radio communications, the problem considers radio wave propagation along the surface of the earth, direct paths through the earth, up over and down paths between submarines, and the possibility of a deeply buried natural waveguide in the earth. For geological investigations, the problem considers the detection of halos of chemically mineralized ore zones associated with faults and dikes, sandstone layers and voids in limestone that trap oil and gas, seams of coal, trona, potash, and anomalies that interfere with orderly extraction of valuable resources. Sommerfield, A., "Uber die Austreitung der Wallen in der Drathlosen Telegraphic", Ann. Physik, Ser 4 Vol. 81, No. 17, pp. 1135-1153, Dec. 1926, provided early theoretical insite into surface wave communications, and Wait, J. R. (guest editor) May 1963 issue of IEEE Trans. Ant. and Prop. Vol. AP.1, No. 3, contributed knowledge regarding communications and techniques for investigating subsurface geological features.

J. R. Wait and D. A. Hill, "Coaxial and Bifilar Modes on a Transmission Line in a Circular Tunnel", Preliminary Report to U.S. Bureau of Mines on Contract No. H0122061 (Sept. 1974); relates to an investigation of propagation of guided waves in tunnels and formulated a theoretical model showing that monofilar and bifilar propagation modes exist for two-wire cable and trolley tracks and power cable types of conductors.

Also, a method for measuring the bulk electrical parameters of a region of the earth which involves measuring the intensity and phase shift values of the magnetic field of an electromagnetic wave simultaneously received in two boreholes is described in R. N. Grubb, P. L. Orswell and J. H. Taylor, "Borehole Measurements of Conductivity and Dielectric Constant in the 300 kHz to 25 MHz Frequency Range", Radio Science, Vol. II, No. 4 (April 1976).

J. R. Wait, "The Magnetic Dipole Antenna Immersed in a Conducting Medium", Proceeding of the IRE (Oct. 1952), points out that a fundamentally different power dissipation relationship exists between electric and magnetic dipole antennas. In the electric dipole case, the radial wave impedance near the dipole is largely real, whereas the impedance is imaginary in the case of the magnetic dipole. The large real impedance results in more energy dissipated near the electric dipole than flows out to large distances.

R. F. Harrington, "Time Harmonic Electromagnetic Fields", McGraw Hill, N.Y. (1961), describes a formula for calculating the current flow produced in a conductor by an incident electric field.

Synchronous detection principles are described by W. R. Bennett and J. R. Davey in "Data Transmission", McGraw Hill Book Company (1965).

Philip F. Panter, in "Modulation, Noise and Spectral Analysis Applied to Information Transmission", McGraw-Hill Book Co., pp. 461-503 (1965), describes the application of receiver frequency feedback compression techniques to decrease the occupied bandwidth of frequency or phase modulated radio signals.

Finally, U.S. Pat. No. 4,577,153, "Continuous Wave Medium Frequency Signal Transmission Survey Procedures for Imaging Structures in Coal Seams", by L. G. Stolarczyk describes a method for constructing images of structures in coal seams using the radio imaging method.

SUMMARY OF THE PRESENT INVENTION

It is therefore an object of the present invention to describe a method for discriminating against the primary wave in a buried conductor detection system.

It is another object of the present invention to present a method for calibrating the transmitting and receiving antennas in a buried conductor detection system.

It is another object of the present invention to provide a method for reducing phase jitter in the transmitted and received signals.

It is another object of the present invention to present a method for using surface radio waves to detect buried conductors.

It is another object of the present invention to present a method for combining transmitter and receiver antennas for buried conductor detection in the same borehole.

It is another object of the present invention to present a method for eliminating geological noise from a buried conductor tomographic scan.

Briefly, a preferred embodiment of the present invention includes an improved method for detecting underground electrical conductors. The prior art methodology for detecting buried conductors included the steps of generating a first electromagnetic field with a transmitting antenna; using the electric field component of the first electromagnetic field to induce a synchronized current flow in an underground electrical conductor; using the magnetic field component of a second electromagnetic field (scattered wave), generated by the current induced in the electrical conductor, to induce a signal in an antenna of a phase coherent receiver deployed in a drillhole; and using synchronous detection measurements and analysis to confirm the existence of the electrical conductor.

In the present invention, the loop of a downhole receiving antenna is positioned orthogonally to the loop coils of a downhole ferrite rod transmitting antenna. This orientation of the antennas discriminates against the reception of the primary wave by the receiver, thus enhancing reception of the scattered wave. This orientation of the receiver antennas is useful both when the buried conductor is contained in a tunnel, e.g. a trolly track or telephone or power line, and when the buried conductor is a geological formation such as a rock mass (e.g. a massive sulfide stringer or a skan in an ore body) or a coal seam.

In another embodiment of the present invention, the receiving antenna is calibrated (synchronously) by using an untuned broadband antenna calibration circuit in the receiver, such as a long wire or an untuned loop or rod antenna, to generate a calibration signal at the receiver operating frequency. The calibration signal establishes the magnitude and phase of the receiver transfer function along the receiver signal path to a synchronous detector. The transmitting antenna is calibrated by measuring (controlling) the magnitude and phase of current flowing in the loop antenna. A phase comparator is used to compare the phase of the transmitting antenna current to the phase of the system synchronization signal.

Phase jitter in the phase locked loop (PLL) circuits contained in the downhole transmitter and receiver is minimized by using fast rise time waveform signals as the synchronization signals that are sent over the fiber optic cables to the downhole transmitter and receiver.

In another embodiment of the present invention, the transmitting antenna is eliminated and surface radio waves propagating in the earth/ionosphere waveguide are utilized to excite the buried conductor. A surface receiving unit is utilized to generate a signal that is sent to the downhole receiver to cancel the phase or frequency modulation of the surface wave. The signal received by the downhole receiver is converted to a continuous wave signal that is processed using real time synchronous (autocorrelation) techniques.

In another embodiment of the present invention a ferrite rod transmitting antenna is connected to a rotatable elongated loop receiver antenna for insertion in a single borehole. The receiver antenna can be rotated so as to permit reception of either a primary wave or a secondary wave.

In another embodiment of the present invention a tomographic scan of a tunnel that is free of geological noise is generated by subtracting the results of a low to medium frequency data scan from the results of high or very high frequency data scan on a pixel by pixel basis.

An advantage of the present invention is that a method is presented for enhancing reception of a scattered wave at a downhole receiver.

Another advantage of the present invention is that a method is presented for calibrating a downhole transmitter and receiver.

Another advantage of the present invention is that phase jitter in the transmitter and receiver are minimized by sending fast rise time digital synchronization signals to the downhole transmitter and receiver.

Another advantage of the present invention is that a method is presented for utilizing surface waves in the detection of buried conductors.

Another advantage of the present invention is that a method is presented for utilizing the surface wave to cancel the phase shift or frequency modulation in the downhole receiver.

Another advantage of the present invention is that a method for detecting a buried conductor using a transmitter and a receiver positioned in one borehole is presented.

Another advantage of the present invention is that a method is presented for eliminating geological noise from a buried conductor tomographic scan.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is an elevational, partially sectioned view of a geological area with an underground tunnel and showing the drillhole configuration according to method I of the prior art;

FIG. 2 is a top elevational view of an alternative embodiment of an antenna configuration for use with method I of the prior art;

FIG. 3 is a top elevational view of another alternative embodiment of an antenna configuration for use with method I of the prior art;

FIG. 4 is a block diagram of the apparatus used in phase synchronous signal transmission and phase coherent signal reception according to the prior art;

FIG. 5 is a block diagram of the synchronous detector which is a component of the apparatus shown in FIG. 4;

FIG. 6 is an elevational, partially sectioned view of a geological area with an underground tunnel and showing the drillhole configuration according to method II of the prior art;

FIG. 7 illustrates the electromagnetic wave field components produced by current flow in a tuned loop antenna;

FIG. 10 is an elevational, partially sectioned view of a geological area with a vertically oriented underground electrical conductor showing the drillhole configuration according to method V of the prior art;

FIG. 11 is a block diagram of an alternative embodiment of the apparatus shown in FIG. 4;

FIG. 12 is an elevational, partially sectional view of an ore vein, containing a plurality of drillholes separated by a distance to be determined according to method VI of the prior art;

FIG. 15 is a block diagram of a system for calibrating a downhole receiver and a downhole transmitter according to the present invention;

FIG. 16 is an elevational, partially sectioned view of a geological area with an underground tunnel and showing a receiver configuration for using a surface wave to detect buried conductors according to the present invention;

FIG. 17 is a block diagram of a receiving system for use with the receiver configuration of FIG. 16;

FIG. 18 is an elevational, partially sectioned view of a drillhole containing a buried conductor detection system containing a transmitter and a receiver according to the present invention;

FIG. 19 is an elevational, partially section view of a buried conductor detction system for use with a geological background subtraction method according to the present invention; and FIG. 20 is a graphical representation of a fast rise time waveform.

DETAILED DESCRIPTION OF THE PREFERRED EMBODIMENT

Figure 8:
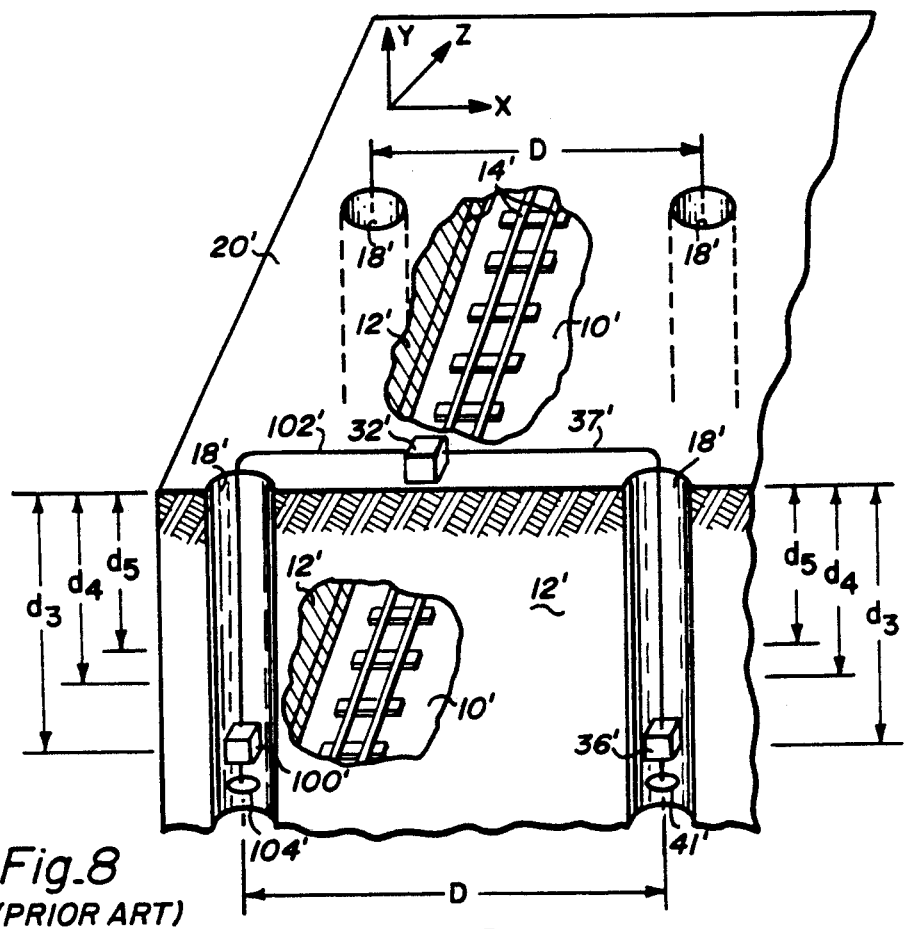
FIG. 8 is an elevational, partially sectioned view of a geological area with an underground tunnel and showing the drillhole configuration according to method III of the prior art.

FIGS. 1-12 show buried conductor detection systems of the prior art.

FIG. 1 shows an underground tunnel 10 surrounded by a rock layer 12 and containing a plurality of electrical conductors 14, illustrated in the form of train tracks. The rock layer 12 conducts electricity much less efficiently than the electrical conductors 14. The electrical conductors 14 may be any objects contained in the tunnel 10 which conduct electricity and which extend along a length of the tunnel 10. The electrical conductors 14 could also be an electrically conducting object embedded in the rock layer 12 such as a thin mineralized conducting ore vein. Other examples of objects that could function as the electrical conductor 14 include small diameter copper power or telephone cables; metal air pipe; trolley power conductor; electrolytic water flowing in plastic water pipes within tunnel 10; electrolyte water filling the entire tunnel 10; seepage of water from dams; or plumes of toxic waste from waste containment repositories.

A plurality of drillholes 18 extend downward through the rock layer 12 from a terrestrial surface area 20. A transmitter 24 is located on the surface area 20 and is coupled by a loop antenna 25 to at least one cable 26 (a grounded dipole). A coupler cable 28 electrically connects the transmitter 24 to the loop antenna 25. When the transmitter 24 is turned on, current flowing in the loop antenna 25 (loop current) is phase synchronized with a signal applied to an input terminal 30 of the transmitter 24. By induction, the loop current causes synchronized current to flow in the cable 26. The cable 26 functions as a long line current antenna and can be a relatively straight piece of insulated wire having a length in the range of 100 to 1500 feet. Alternatively, a plurality of cables 26 may be deployed in a fan-like pattern, as shown in FIG. 2, which subtends an angle $\theta$ of approximately ninety degrees. The cable 26 could also be formed into a cable loop having a large diameter X as shown in FIG. 3.

Returning to FIG. 1, a coherent frequency source unit 32 is optically connected to the transmitter 24 by a fiber optic cable 34 running from the unit 32 to the input terminal 30. A receiver 36 is also optically connected to the coherent frequency source unit 32 by a fiber optic cable 37 comprising an uplink fiber optic fiber 38 and a downlink fiber optic fiber 40 (shown in FIG. 4). The receiver 36 includes an electrically short ferrite vertical loop magnetic dipole antenna 41 with the loop coils of antenna 41 approximately located in the x-z plane (magnetic moment vector aligned with the z-axis). The coherent frequency source unit 32 is capable of generating at least two low frequency signals in the frequency range of one to three hunderd kilohertz (1–300 kHz). The coherent frequency source can also generate frequencies in the high frequency (HF) and very high frequency (VHF) bands for use in the precise measurement of distance. The receiver 36 is deployed in at least one of the drillholes 18 at a depth $d_1$.

The transmitter 24, the coherent frequency source unit 32 and the receiver 36 may comprise the components shown in FIG. 4. A quartz crystal reference oscillator 42 generates a crystal oscillator output signal $S_c$ having a crystal frequency $f_c$ which is divided in a division state machine 44 by an integer K to produce a first reference signal $S_{refa}$ having a reference frequency $f_{ref}$ and a phase of zero degrees. All signals leaving the coherent frequency source unit 32 are phase synchronized with the signal $S_{refa}$. The division machine 44 also produces a second reference signal $S_{refb}$ offset in phase from $S_{refa}$ by ninety degrees. The signals $S_{refa}$ and $S_{refb}$ are required in the synchronous detection process.

The signal $S_{refa}$ is used in a conventional phase lock loop circuit 46 to generate a preliminary transmit signal $S_T'$ which is phase synchronized with the signal $S_{refa}$. The oscillator 42 output signal $S_c$ is also used as a preliminary receiver local oscillator signal $S_{Lo}'$. Before the signals $S_T'$ and $S_{Lo}'$ are sent to the transmitter 24 and receiver 36 respectively, they are converted in frequency to the required system operating frequency band. The signal $S_T'$ is mixed by difference mixing in a mixer 48 connected to a quartz crystal conversion oscillator 50 to produce an operating transmit signal $S_T$.

Similarly, the signal $S_{Lo}'$ is mixed with the same quartz crystal conversion oscillator 50 signal in a mixer 52 to produce an operating receiver local oscillator signal $S_{Lo}$. After mixing, the signals $S_T$ and $S_{Lo}$ have the frequencies $f_o$ and $f_{Lo}$, respectively. When the signals $S_{Lo}$ and $S_T$ are derived by this signal generation process, the signals are said to be phase coherent. The phase drift and incidental phase variation occurring in the conversion oscillator 50 appears identically in the total phase of the signals $S_T$ and $S_{Lo}$. The phase drift and incidental phase variations are cancelled in the receiver mixing process.

The signal $S_{Lo}$ is sent by the downlink fiber optic fiber 40 to a mixer 60 contained in the receiver 36. The receiver 36 also comprises the ferrite vertical loop magnetic dipole antenna 41 which is electrically connected to an amplifier 64 which is electrically connected to the mixer 60. The mixer 60 is electrically connected to an IF amplifier/optical fiber transmitter unit 66 which is connected by the uplink fiber optic fiber 38 to a synchronous detector 70 contained in the source unit 32. A microcomputer 72 is electrically connected to the detector 70. The reference signal $S_{refa}$ is sent to the phase lock loop circuit over the lead 76 and to the synchronous detector 70 over the lead 78. The reference signal $S_{refb}$ is sent to the synchronous detector over the lead 80.

In the coherent frequency source unit 32, the crystal frequency $f_c$ of the signal $S_c$ could be 10.24 MHz, the reference frequency $f_{ref}$ of the signal $S_{refa}$ could be 2.5 kHz and the integer K could be 4096.

Alternatively, the synchronization signal $S_{refa}$ can be sent over a fiber optic cable to a phase lock loop (PLL) circuit in each downhole instrument (see FIG. 11). The PPL's generate the transmit signal ($S_T$) and the receiver local oscillation signal ($S_{Lo}$) in the downhole instruments.

The antenna 41 is capable of receiving electromagnetic signals. For example, for a properly oriented magnetic field $H_\theta$ at 100 kHz, the loop emf is given by:

$$emf = (4.02 \times 10^{-2}) H_\theta.$$

The loop signal is amplified by the amplifier 64 and mixed with the signal $S_{Lo}$ in the mixer 60. The frequency $S_{Lo}$ is given by:

$$f_{Lo} = f_o - f_{ref}.$$

Difference mixing in the mixer 60 produces an intermediate signal $S_{IF}$ that is represented by the form:

$$S_{IF} = B \sin(2\pi f_{ref} + \theta_2).$$

The phase $\theta_2$ is the sum of all phase shifts encountered in the signal path commencing at the source unit 32 output terminal to the output terminal of the IF amplifier 66. The geologic medium phase shift contribution $\theta_M$ is included in $\theta_2$. The conventional synchronous detector 70 along with the microcomputer 72 measure the magnitude and phase signal $S_{IF}$.

FIG. 5 is a block diagram of the synchronous detector 70. The signal $S_{IF}$ enters the detector 70 through the uplink fiber 38 where it encounters a pair of analog switch units 90 and 92 which receive the signals $S_{refa}$ and $S_{refb}$, respectively. The switches 90 and 92 perform the multiplication processes of $S_{IF} \times S_{refa}$ and $S_{IF} \times S_{refb}$. After low pass filtering by a pair of low pass filters 94 and 96, a pair of orthogonal voltages $e_x$ and $e_y$ are generated and fed to a multiplexer (analog-to-digital converter) 98. The phase $\theta_2$ is calculated as $$\theta_2 = \tan^{-1} e_x/e_y$$

and the amplitude B is calculated as $$B = (e_x^2 + e_y^2)^{\frac{1}{2}}.$$

The theory of operation of the system shown in FIG. 1 is as follows. First, the source unit 32 generates a phase synchronizing signal required for the signal $S_T$ of the frequency $f_o$ which is sent to the transmitter 24 via the cable 34. The signal $S_T$ may be a sine wave having the form $A\sin(2\pi f_o t + \theta_A)$ where A is the amplitude, t is time and $\theta_A$ is the phase shift value. The transmitter 24 and the antenna 25 excite primary current flow in the cable 26. The primary current flow causes a first electromagnetic field $EM_1$ to propagate down through the rock layer 12. If an electric field component $E_z$ of the field $EM_1$ encounters one of the electrical conductors 14 oriented parallel to the length of cable 26, a strong secondary current flow will be induced in the parallel conductor 14. Secondary current flow will also be induced in conductors 14 that are not oriented parallel to cable 26, but the magnitude of this nonparallel current flow will be small. The fan-like pattern of cables 26, shown in FIG. 2, and the large diameter loop configuration, shown in FIG. 3, are designed to maximize the possibility that the polarized electric field component $E_z$ will encounter a parallel electrical conductor 14.

The secondary current flow will propagate along the conductor 14 and will generate a second electromagnetic field $EM_2$ which will propagate through the rock layer 12 with a frequency $f_o$, but with a different amplitude and phase shift than that of signal $S_T$. The vertical magnetic dipole antenna 41 within the receiver 36 is properly oriented to receive the magnetic component $H_0$ of $EM_2$ as a received signal $S_R$. The signal $S_R$, has a wave form $B\sin(2\pi f_o + \theta_B)$ where B is the new amplitude and $\theta_B$ is the new phase shift value. The signal $S_R$ is amplified by the amplifier 64 and sent to the mixer 60. The mixer 60 is being supplied with the signal $S_{Lo}$ generated in a coherent frequency source unit 32 and transmitted to the mixer 60 via the fiber 40. The signal $S_{Lo}$ has the form $D\sin 2\pi(f_o - f_{ref})t$ where D is the amplitude of the signal $S_{Lo}$. The mixer 60 forms a final signal $S_{IF}$ by adding $S_{Lo}$ to $S_r$ yielding equation (1).

$$S_{IF} = C \sin(2\pi f_{ref} t + \theta_m) \quad (1)$$

where C is the amplitude of $S_{IF}$ and $\theta_m$ is the phase shift.

The final signal $S_{IF}$ is sent through the uplink fiber 38 to the synchronous detector 70 where the amplitude C and the phase shift $\theta_m$ are determined by using synchronous detection principles. In the absence of a conductor 14, the amplitude C will be zero because the separation between the receiver 36 and the cable 26 is too great to permit reception of the signal $S_T$.

The cable 26 is located at a specific position and the receiver 36 is moved between the plurality of drillholes 18 with at least one phase shift measurement taken at each drillhole 18 location. Taking a plurality of amplitude and phase shift measurements at a different plurality of depths $d_1$ within each drillhole 18 would improve the probability of detecting the conductor 14. Alternatively, the receiver 36 could be held within a single drillhole 18 and the position of the cable 26 could be varied.

For convenience, the method of placing the cable 26 at a surface location and detecting the conductor 14 by making measurements with the downhole receiver 36, will be referred to as method I. The feasibility of method I has been verified by a combination of theoretical and empirical measurements.

In an actual experiment, a 100 meter long cable was positioned on the surface of the York Canyon Mine in the general direction of the man and material passageway located approximately one hundred meters below the surface. The mudstone roof rock had a conductivity of approximately $1 \times 10^{-2}$ mhos/meter. The cable was excited with approximately 100 mA of current at 300 kHz. A current of eleven microamperes was measured in a telephone cable located in the passageway.

Table A shows the minimum detectable secondary current levels for non-coherent and coherent phase receivers when the conductor 14 and the receiver 36 were separated by thirty and seventy meter radial distances. These figures indicate that the eleven microamperes signal actually measured in the York Canyon Mine is sufficient for detecting the conductor 14 located seventy meters from the receiver 36 using the synchronous detection technique of method I.

TABLE A

Minimum Detectable Tunnel Electrical Conductor Secondary Current in Microamperes
($f = 100$ kHz; $\sigma = 10 \times E - 03$ mhos/m; $\epsilon_r = 10$)

| Antenna Diameter | Coherent Receiver | | Non-Coherent Receiver | |
|---|---|---|---|---|
| | 30 m | 70 m | 30 m | 70 m |
| 1 inch | 0.52 | 1.78 | 50.1 | 177.8 |
| 2 inches | 0.13 | 0.44 | 12.58 | 48.08 |

The data in Table A was calculated by the following method. First, the following equation (2) was used to calculate the magnetic field component $H_0$ produced by the secondary electromagnetic field $EM_2$.

$$H\phi = -\hat{\phi}\left(\frac{iI_s k}{4}\right) H_1^{(2)}(\kappa\rho) \quad (2)$$

where $\rho$ = the radial distance from the conductor;
$I_s$ = the secondary current in amperes; and
$H_1^{(2)}(\kappa\rho)$ = the Hankel function of the second kind of first order.
(Equation 2 is taken from M. L. Burrows, "ELF Communications Antennas" Peter Peregrinus Ltd., England (1978)).

Next, when H0 threads the loop area of the ferrite vertical magnetic dipole antenna 41, a receiving antenna response, given by Faraday's law, is produced according to:

$$\text{emf} = AN\mu_r \omega |H_0| \quad (3)$$

where A = the area of the loop antenna in square meters,
N = number of turns,
$\mu_r$ = the magnetic permeability of the antenna, and
$\omega$ = the radian frequency of the system.

The sensitivity of a non-phase coherent RIM receiver is better than ten nanovolts and the phase coherent sensitivity improves to 0.1 nanovolt. A vertical ferrite rod antenna exhibits the electrical properties shown in Table B.

TABLE B

Ferrite Rod Antenna Electrical Properties at 100 kHz

| Diameter | Area (m²) | emf (volt) |
|---|---|---|
| 1 inch | $5.07 \times 10^{-4}$ | $(4.02 \times 10^{-2}) H_\phi$ |
| 2 inches | $2.03 \times 10^{-3}$ | $(1.62 \times 10^{-1}) H_\phi$ |

($H_\phi$ = the value of the magnetic field at the receiver location)

Finally, the minimum detectable current flow in the tunnel electrical conductors is determined from Table B data, the threshold sensitivity of the downhole receivers and the value of magnetic field determined from Equation (2) at radial distances of thirty and seventy meters. It may be possible to increase the receiving loop response by using laminated signal transformer metal, e.g. nickel-iron alloy of the Permalloy type. Very high permeabilities of the order of $10^4$ times the free space value can be obtained. Building the core cross-section area from insulated laminations can increase the area and reduce core loss to the point where they are negligible compared with the winding loss. The long and slender antenna will achieve good coupling to the signal field with operating frequencies below ten kHz; however, these low frequency antennas may also be sensitive to the earth's geomagnetic field. Since the vertical orientation of the antenna will be used in the borehole, the antenna will not strongly couple to the earth's field.

FIG. 6 shows an alternative method for detecting the electrical conductor 14'. For convenience, this method will be referred to as method II. Elements in FIG. 6 that are identical to elements described with respect to FIG. 1 are designated by the same reference numeral used in FIG. 1 followed by a prime symbol.

In FIG. 6, a synchronized downhole transmitter 100 is positioned at a depth $d_2$ within one of the drillholes 18' and is optically connected to the source unit 32' by a fiber optic cable 102. The transmitter 100 includes an electrically short vertical magnetic dipole antenna 104 such as a ferrite rod antenna with the loop coils of the antenna 104 oriented approximately in the x-z plane.

FIG. 7 shows the fields produced by a magnetic dipole aligned with the y axis. The cartesian coordinate system (x, y, z) is oriented so the loop lies in the horizontal x-z plane with its vertical magnetic moment (M=NIA) aligned along the y axis. Hence, FIG. 7 depicts a vertical magnetic dipole antenna. The spherical coordinate system ($\theta$, 0, r) is used to describe the general orientation of field components in the geologic medium 12. A meridian plane 106 is orthogonal to the x-z plane and includes the y axis. The magnetic dipole field components are given by the following equations 4 through 6.

Meridian Plane Azimuthal Component $$H_\theta = \frac{Mk^3}{4\pi}\left[\frac{1}{(kr)^3} + \frac{i}{(kr)^2} - \frac{1}{(kr)}\right]e^{-ikr}\sin\theta. \quad (4)$$

$$H_r = \frac{Mk^3}{2\pi}\left[\frac{1}{(kr)^3} + \frac{i}{(kr)^2}\right]e^{-ikr}\cos\theta. \quad (5)$$

$$E_\phi = \frac{Mk^3}{4\pi}\left[\frac{\mu}{\epsilon}\right]^{\frac{1}{2}}\left[\frac{i}{(kr)^2} + \frac{1}{kr}\right]e^{-ikr}\sin\theta. \quad (6)$$

The electrical vector is perpendicular to the meridian plane and subscribes concentric circles around the y axis magnetic dipole moment vector. The terms in the equations 4, 5 and 6 have been arranged in the inverse powers of r. In the immediate neighborhood of the magnetic dipole moment, the "static" and "induction" fields in $1/r^3$ and $1/r^2$ predominate while at distance $r >> \lambda/2\pi$ or $kr >> 1$ only the "radiation" field has significant value. The radiation fields are given by the following equations 7 and 8:

$$H_\theta = \left[\frac{Mk^3}{4\pi}\right] \frac{e^{-ikr}}{(kr)} \sin\theta \tag{7}$$

$$E_\phi = \left[\frac{Mk^3}{4\pi}\right]\left[\frac{\mu}{\epsilon}\right]^{\frac{1}{2}} \frac{e^{-ikr}}{(kr)} \sin\theta \tag{8}$$

The radiation fields are transverse (orthogonal) which is expected of wave propagation at great distances from all electromagnetic sources. The magnitude of the magnetic field component $H_\theta$ can be expressed in terms of the ratio $\alpha/\beta$ and $\beta_r$ as $$|H_\theta| = \frac{M}{4\pi r^3}[\beta r e^{-(\frac{\alpha}{\beta})\beta r|[\frac{1}{\beta r} - \beta r + (\frac{\alpha}{\beta}) + \beta r(\frac{\alpha}{\beta})^2]^2 + [1+2\beta r(\frac{\alpha}{\beta})]^2|^{\frac{1}{2}}}], \tag{9}$$

where, $\kappa = \beta - i$ and $\alpha$ = attenuation constant (imaginary part of wave number) in neper/meter; and $\beta$ = phase constant (real part of the complex wave number in radians/meter)

The phase $\theta$ is mathematically represented by $$\theta = -\beta r + \text{Tan}^{-1}\left[\frac{1 + 2\beta r\left(\frac{\alpha}{\beta}\right)}{\frac{1}{\beta r} - \beta r + \beta r\left(\frac{\alpha}{\beta}\right)^2 + \left(\frac{\alpha}{\beta}\right)}\right]. \tag{10}$$

The axis of the receiving loop antenna 104 is always parallel to the axis of the drillhole 18′. The loop response is given by Equation 3 (Faraday's Law).

The processing of the received signal $S_R$ in the source of unit 32′ recovers the logarithm of the loop response as $$20\text{Log}_{10}|H_\theta| = 20\text{Log}_{10}\frac{M}{4\pi r^3} + 20\log_{10}[A]. \tag{11}$$

When $\beta_r$ is less than 0.5 radian, the magnetic field is relatively independent of the media electric parameters; however, when $\beta r$ is greater than 2, the amplitude of the field is highly dependent on the ratio $(\alpha/\beta)$. If r is less than 0.5 radian, the phase shift change with range is less than four degrees. When $\beta r$ is between 0.5 and 1.5 radians, the phase shift change with distance may increase or decrease with range and depends on $(\alpha/\beta)$. Above $\beta r = 1.5$, the phase shift increase with range. Phase shift depends strongly on $(\alpha/\beta)$.

The magnitude of the electric field component E can be expressed as $$|E_\phi| = \tag{12}$$

$$\frac{M}{4\pi r^3}\left[\frac{\mu}{\epsilon}\right]^{\frac{1}{2}}[\beta r e^{-(\frac{\alpha}{\beta})\beta r|[-\beta r + (\frac{\alpha}{\beta}) + \beta r(\frac{\alpha}{\beta})^2]^2 + [1+2\beta r(\frac{\alpha}{\beta})]^2|^{\frac{1}{2}}}]$$

and the phase $\theta$ by $$\theta = -\beta r + \text{Tan}^{-1}\left[\frac{1 + 2\beta r\left(\frac{\alpha}{\beta}\right)}{-\beta r + \left(\frac{\alpha}{\beta}\right) + \beta r\left(\frac{\alpha}{\beta}\right)^2}\right]. \tag{13}$$

In a uniform geologic medium, the meridian plane magnetic field ($H_\theta$) component is polarized normal to the area of the receiving loop antenna 41′ when $\theta = \pi/2$. At 100 kHz, the loop emf is given by $$\text{emf} = (4.02 \times 10^{-2}) H_\theta. \tag{14}$$

Returning to FIG. 6, method II can be summarized as follows: The source unit 32′ sends the signal $S_T$ having the frequency $f_o$ to the transmitter 100. The signal $S_T$ has the same waveform as was previously described for method I, specifically, A sin $(2\pi f_o t + \theta A)$. The transmitter 100 then causes a first electromagnetic field $EM_1$, to propagate through the rock layer 12′. As in method I, secondary current will be induced in the conductor 14′ when an electric field component $E_z$ of the field $EM_1$ encounters one of the electrical conductors 14′ oriented in the z direction. Calculations have shown that current response increases in the frequency range of 1 to 500 kHz. Thus, any frequency in this band could be used as the frequency $f_o$. However, since the receiver antenna 62 output voltage increases with frequency, it is advisable to use the highest practical frequency and 300 kHz is used preferrentially. The receiver 36′, positioned in a separate drillhole 18′ from the transmitter 100, responds to the magnetic field $H_0$ produced by the secondary current flow. The phase shift and amplitude values can be calculated from the data received at the receiver 36′ in the same manner as previously described for method I.

In method II, optimal search strategy will be achieved when the transmitter and receiver drillholes 18′ each have center lines orthogonal to the longitudinal dimension of the conductor 14′, i.e., when the conductor 14′ and the drillholes 18′ all lie along parallel lines. Additionally, in method II, the drillholes 18′ should be in close proximity to the conductor 14′, generally, within approximately 100 meters. However, the drillhole 18′ containing the transmitter 100 must be far enough away from the drillhole 18′ containing the receiver 36′ so that the primary wave ($EM_1$) is extinguished at receiver 36′. Furthermore, a plurality of measurements can be taken at each drillhole 18′ location by varying the depth $d_1$ of the receiver 36′ or the depth of $d_2$ of the transmitter 100. The depths $d_1$ and $d_2$ can be different.

Table C lists the results of experimental measurements of the secondary current flow induced in a two foot wide mine ventilation pipe (conductor 14′) by the downhole transmitter 100. Magnetic field strength measurements were made in the tunnel with a tuned loop antenna (300 kHz) and a field strength meter. The emf, defined by Equation (15) was measured and recorded in decibels above one nanovolt.

TABLE C

Measured Field Strength Inside a Tunnel (dB re 1 nanovolt)

| Measuring Station | Approximate Distance (ft) From Transmitter 44 | Field Strength (H) Center of Tunnel (10') | Field Strength (H) Near Conductor (14') |
|---|---|---|---|
| 1 | 300 | 85.6 | 100 |
| 2 | 250 | 82.0 | 100 |
| 3 | 200 | 86.0 | 101 |
| 4 | 150 | 101.0 | 96 |
| 5 | 100 | 111.0 | 103 |
| 6 | 50 | 123.0 | * |
| 7 | 50 | 131.0 | * |

* = Pipe ends where N=the number of turns used in the antenna design,
A=the area of the loop in square meters,
f=the operating frequency,
$\mu$=magnetic permeability of the antenna, and
H=field strength from Table C.

FIG. 8 shows another alternative method for detecting the underground conductor 14'. For convenience, this method will be referred to as method III. Elements in FIG. 8 that are identical to elements in FIGS. 1 or 6 are designated by the same reference numeral followed by a prime designation.

In FIG. 8, the transmitter 100' and the receiver 36' are positioned in the pair of drillholes 18' separated by a distance D, that straddle the conductor 14' (i.e., one drillhole 18' is located on each side of the conductor 14' so that the transmitter 100' and the receiver 36' are contained in a vertical plane that bisects the conductor 14'). In method III, the maximum value for the separation distance D is approximately twenty meters. In one technique for using method III, referred to as a reconnaissance scan, the transmitter 100' and the receiver 36' are always maintained at the same depth, depth $d_3$ for example, with respect to each other. After a measurement is taken, the transmitter 100' and the receiver 36' are each moved to a second depth, $d_4$ for example, and another measurement is taken.

This cross-hole reconnaissance scan process is designed to measure the receiver drillhole total field amplitude and the phase shift as both of these parameters vary with depth. The variation occurs at the depth corresponding to the location of the conductor 14'. The transmitter 100' emits the plane wave signal $S_T$ having the frequency $f_o$ as described previously for method II. The electric field component of the signal $S_T$ ($E_z^i$) is polarized in the direction parallel to the conductor 14' (the z direction). When the signal $S_T$ encounters the conductor 14' a scattered wave is produced which simultaneously produces secondary current flow in the conductor. This scattering phenomena increases with decreasing thickness of the conductor 14' when the electric field component is z polarized. The electric field component of the scattered wave ($E_z^s$) is also polarized in the z direction. The total electric field ($E_z$) at any point outside the conductor 14' is given by $$E_z = E_z^i + E_z^s. \qquad (16)$$

Variations in the amplitude and phase shift parameters are determined by measuring $E_z$ at the position of the receiver 36'. The phase shift and amplitude determinations are made as previously described for method I.

For computational purposes, the receiver drillhole field is the vector sum of $E_z^i$, computed at the radial distance $r_1$ extending from the transmitter loop antenna 104' to the receiver loop antenna 41', and $E_z^s$ computed at a radial distance $r_2$ extending from the conductor 14' to the receiver loop antenna 41'. The magnetic field components associated with the $E_z$ field are measured in the receiver.

In a second technique utilizing the method III transmitter/receiver configuration, the receiver drillhole field can also be measured versus the depth of the receiver 36' above and below the depth of the conductor 14'. In this technique, called a shadow scattering wave scan, the transmitter 100' is held at a specific depth, $d_4$ for example, and the receiver 36' is moved to incremental elevations, such as $d_3$, $d_4$ and $d_5$, above and below the conductor 14'. The magnetic field components associated with $E_z$ are measured at each incremental elevation. Alternatively, the depth of the receiver 36' could be held constant and the depth of the transmitter 100' could be varied.

Table D lists the results obtained in a typical shadow scattering wave scan. In this system, $f_o$ was 10 kHz and the conductivity of the rock layer 12' was 0.001 mho/m. The distance D was twenty meters and the antenna 104' was five meters from the conductor 14'. With synchronous detection techniques, amplitude resolution of better than 0.1 dB is possible and phase shift resolution of better than 0.3 degrees can be measured.

TABLE D

| Elevation Change Above/Below Conductor (In meters) | Initial Amplitude (dB) | Change In Amplitude (dB) | Initial Phase (degrees) | Phase Shift (degrees) |
|---|---|---|---|---|
| 0 | 65 | 5 | 44 | 88 |
| 13 | 65 | 4.5 | 44 | 84 |
| 20 | 65 | 3.9 | 44 | 75 |

Because of the limitation imposed on the method III technique by the restricted range of acceptable D values, method III is most useful for pinpointing the location of the conductor 14' after its rough location has been determined by methods I or II. Method III is also useful where the conductor 14' is a thin conducting ore vein contained in the rock layer 12'.

Figure 9:
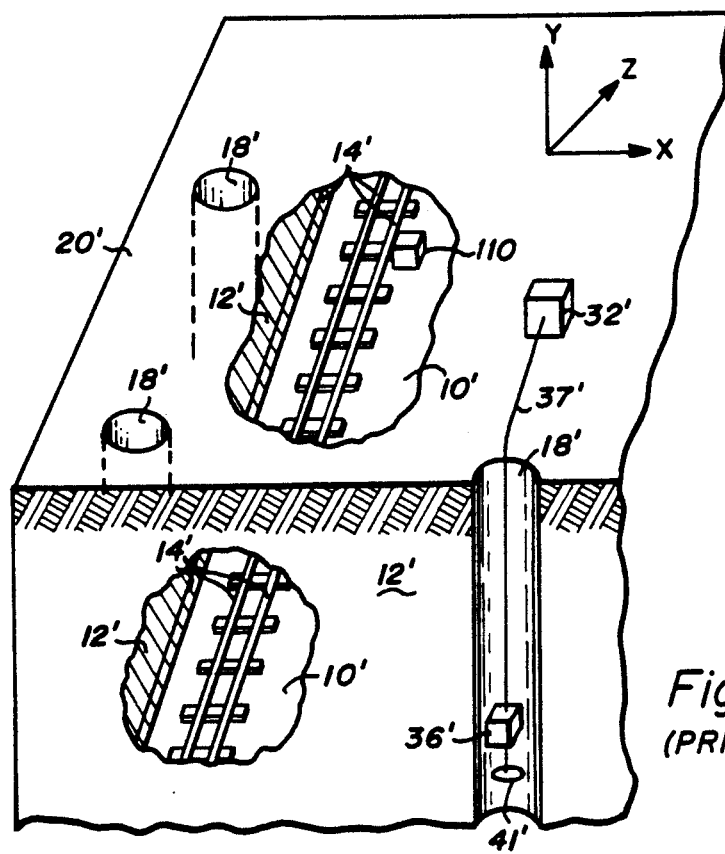
FIG. 9 is an elevational, partially sectioned view of a geological area with an underground tunnel and showing the drillhole configuration according to method IV of the prior art.

FIG. 9 illustrates another alternative method for detecting the electrical conductor 14'. For convenience, this method will be referred to as method IV. Elements of FIG. 9 identical to elements described with respect to FIGS. 1, 6 and 8 are designated by the same reference numeral used in FIGS. 1, 6 and 8, followed by a prime symbol.

In FIG. 9, the receiver 36' is lowered into the drillhole 18'. The receiver 36' is connected to the source unit 32' by the cable 37'. At least one piece of mine electrical equipment 110 is located inside the mine 10'. The mine electrical equipment 110 could be an electrical motor, a trolley power system, a high energy transformer or any other piece of electrical equipment that produces non-continuous voltage or current (electrical noise) in the electrical power distribution system.

In method IV, the mine electrical equipment 110 generates electrical noise which induces current flow in the electrical conductors 14'. This conductor flow produces an electromagnetic field that propagates through the rock layer 12' where it can be detected by the receiver 36'. For example, electrical motors and power systems switching transients induce electrical noise signal current flow in the underground mine electrical conductors. Switching transients occuring on surface power transmission lines or in the underground mine produce multiple high energy transients in the millisecond time duration range. AC induction motors produce triangular wave form currents during the motor startup period. The resulting frequency spectrum exhibits a $1/f^2$ amplitude function with spectrum components separated by the power system frequency. Trolley power systems produce noise signal currents with a sinx/x amplitude function. A feature of this spectrum is that nulls in the sinx/x spectrum are relatively electrical noise free. High energy transformers frequently produce ferroelectric response at 1800 Hz. These noise signals produce current flow in the mine electrical conductors.

The methods I through IV can also be used in conjunction with each other. For example, method IV could be used as a rough indicator of the existence of the electrical conductor 14. Methods I or II could be used to identify the approximate location of the electrical conductor 14 and method III could be used to pinpoint the location. Method III is best suited for detecting a thin conductive ore vein that intersects the plane between the drillholes 18.

FIG. 10 illustrates another method of the prior art. For convenience, this method will be referred to as method V. Elements of FIG. 10 identical to elements described with respect to FIGS. 1, 6, 8 and 9 are designated by the same reference numeral used in FIGS. 1, 6, 8 and 9 followed by a prime symbol.

In FIG. 10, an electrical conductor 114 extends vertically downward (in the y-direction) from a surface region 116. In FIG. 10 the conductor 114 is depicted as being a borehole circumscribed by a casing 118 made of a metal or some other material. Alternatively, the conductor 114 could be an uncased borehole or a vertical shear zone filled with highly conductive mineralized rock or sea water or any other electrically conducting object oriented in the vertical direction. The conductor 114 need not extend all the way up to the surface region 116. The region 116 may comprise, for example, land, concrete or conductive water. The conductive water may fill the borehole.

A plurality of horizontal drillholes 120 extend horizontally away from an underground area 124 (i.e. approximately in the x-z plane). An intermediate orientation is possible provided that the transmitted E field is polarized with the conductor. The underground area 124 is similar to the underground tunnel 10, but may or may not contain the plurality of electrical conductors 14. At least two of the drillholes 120 should be in a horizontal plane (x-z plane) which is approximately perpendicular to the length of the conductor 114. These two drillholes 120 are separated by the distance D and straddle the conductor 114.

The transmitter 100' is inserted into at least one of the drillholes 120. However, in method V, the transmitter 100' includes an electrically short horizontal magnetic dipole antenna 126, such as a ferrite rod antenna, instead of the vertical magnetic dipole antenna 104'. The coils of the antenna 126 lie approximately in the y-z plane of FIG. 10.

The receiver 36' is inserted into at least one of the drillholes 120 not containing the transmitter 100'. The receiver 36' includes an electrically short horizontal magnetic dipole antenna 128, such as a ferrite rod antenna, with coils that lie approximately in the y-z plane of FIG. 10.

The transmitter 100' and the receiver 36' are connected to the coherent frequency source unit 32' by the fiber optic cables 102' and 37', respectively. In method V, the source unit 32' can be located in the underground area 124.

Method V can be used to detect the vertical electrical conductor 114 in an analogous manner to that used in method III described previously (illustrated in FIG. 8). The existence of the conductor 114 can be detected by a reconnaissance scan, where the transmitter 100' and the receiver 36' are always maintained at parallel positions within the drillholes 120 or by the shadow scattering technique where the relative position of the receiver 36' is varied incrementally with respect to the position of the transmitter 100'.

In both techniques, total field amplitude and phase shift are measured as was discussed previously in connection with method III. However, in method V, the electric field component of the signal $S_T$ is polarized in the y direction because that is the direction in which the conductor 114 is oriented. An intermediate orientation is possible provided that the transmitted E field is polarized with the electrical conductor.

FIG. 11 shows an alternative embodiment of the coherent frequency source unit 32 represented by the general reference numeral 134. Elements in the alternative embodiment 134 which are identical to the elements of the coherent frequency source unit 32 are represented by the same numeral followed by a prime symbol.

In the unit 134, the phase lock loop circuit 46 is eliminated and a receiver phase lock loop (PPL) circuit 136 is connected between the mixer 60' and the division state machine 44' by a fiber optic cable 138. In this configuration, $S_{refa} = S_{Lo}$. The PPL circuit 136 is included within the receiver 36' for insertion in the drillhole 18. A transmitter phase lock loop (PLL) circuit 140 is connected to the cable 138 by fiber optic cable 142. The PPL circuit 140 is also connected to the transmitter 100'. The PPL circuit 140, the transmitter 100' and the antenna 104' comprise a transmitter unit 142 which can be inserted in the drillhole 18'.

With the unit 134, the audio frequency band $S_{refa}$ can be sent over the cables 138 and 142 to synchronize the PLL circuits 136 and 140 respectively in each downhole probe. The fiber optic path bandwidth can be less than 10 kHz resulting in lower cost design.

FIG. 12 illustrates another method according to the prior art. For convenience, this method will be referred to as method VI. Elements of FIG. 12 which are identical to elements described previously with respect to FIGS. 1, 6, 8, 9 and 10 are designated by the same reference numeral used in FIGS. 1, 6, 8, 9 and 10 followed by a prime symbol.

In FIG. 12, the transmitter 100' and the antenna 104' have been lowered into a vertical drillhole 150 along a centerline 152 which is a line coincident with the geometric center of the drillhole 150. The drillhole 150 is drilled vertically from an undercut level 154 through an ore vein 156 to a sub-level 158. The ore vein 156 is a natural resource medium which is to be mined by a technique such as block caving, vertical crater, retreat or by the stope mining method. The undercut level 154 is a region cut on top of the vein and the sub-level 158 is a region cut under the vein which runs approximately parallel to the undercut level 154. The receiver 36' and the antenna 41' have been lowered into a second vertical drillhole 160 which is approximately parallel to the drillhole 150 and which has a centerline 162 coincident with the geometric center of the drillhole 160. The centerlines 152 and 162 are separated at various depths $d_1$ and $d_2$ by the distances $D_1$ and $D_2$, respectively. If the drillholes 150 and 160 are not exactly parallel, $D_1$ will not be equal to $D_2$.

Method VI is used to determine whether the drillholes 150 and 160 are parallel or not. Whether the drillholes are parallel is important because in the blockcaving, vertical crater, retreat or stope mining techniques, the drillholes 150 and 160 are plugged and then loaded with an explosive. Detonation of the explosive cause fragmentation of the ore vein 156 producing small size rocks (muck) which is removed by scoop-tram or long-haul-dump (LHD) equipment on the sub-level 158. Horizontal or near vertical slip planes can cause the drillholes 150 and 160 to have an inclination azimuth angle that is different than zero. If the crosshole distance $D_1$ or $D_2$ is too great, the fragmentation produces large boulders that increase mining costs. Therefore, measurement of crosshole distance can improve extraction efficiency.

In method VI, the transmitter 100' is used to launch an electromagnetic (EM) wave which propagates through the ore vein 156 to the receiver 36'. The intensity and phase of the EM field components depend on the distance $D_1$ and on the electric parameters of the geologic medium such as the electrical conductivity ($\sigma$), the dielectric constant ($\epsilon$) and the magnetic permeability ($\mu$). In method VI, the preferred operating frequency is 10 MHz and in some applications could be as high at 100 MHz.

It can be analytically shown that the phase changes by 1.8 electrical degrees for each inch of change in distance between the center lines 152 and 162. A reference parameter such as the phase R' can be measured at the depth $d_1$ corresponding the the distance $D_1$. At the depth $d_1$, the distance $D_1$, can be accurately determined by a certified near surface downhole survey procedure such as surface laser survey instruments that locate center lines each drillhole. As the transmitter 100' and the receiver 36' are simultaneously lowered to the new depth, $d_2$, the antenna 41' responds to the magnetic field component of EM wave. The source unit 32' reads and records the reference parameters, such as the intensity and phase of the received signal, as was described previously for method I. Any phase shift change from the reference $\theta_R$ indicates a change in the drillhole centerline distance.

Method VI could also be used to detect changes in the centerline distance between horizontal drillholes by use of the receiver/transmitter configuration shown in FIG. 10.

Various improvements of methods I-VI enhance detection of the electrical conductors 14 (or 14'). These improvements may be grouped into six categories: First, the receiver antennas may include a horizontal magnetic dipole antenna to cancel reception of the primary wave and thus increase the reception sensitivity of the scattered wave. Second, the transmitters 100 or 100' and the receivers 36 or 36' can be calibrated so as to reduce the effects of detuning of the antenna circuits by mineralized layers around the drillholes 18 or 18'. Third, the effects of surface wave modulation can be cancelled. Fourth, the transmitting and receiving antennas can be located in the same borehole. Fifth, the geological noise, caused for example by changes in the electrical parameters of ore bodies, can be subtracted from the received signal. Sixth, a fast rise time digital signal is used in place of a sinusoidal signal to minimize phase jitter in the downhole receiver and transmitter PLL circuits. The six categories of modifications are illustrated in FIGS. 13-20.

Figure 13:
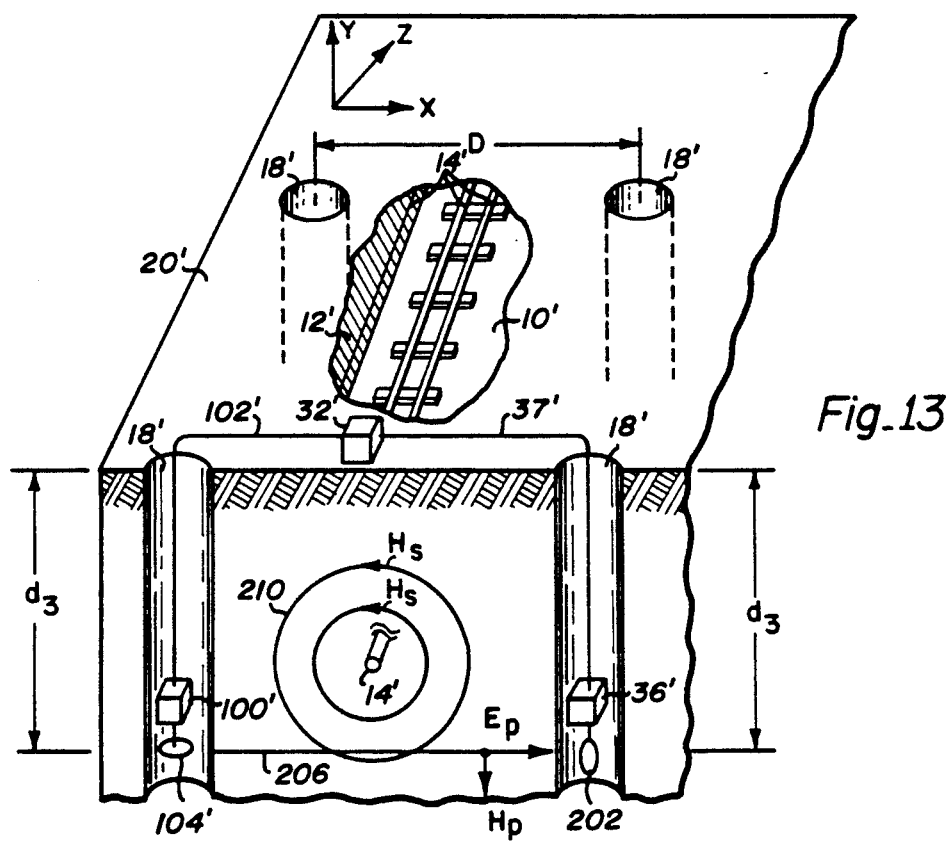
FIG. 13 is a schematic diagram of an orthogonal receiver/transmitter antenna system according to the present invention.

FIG. 13 shows a receiver antenna 202 positioned orthogonally to the transmitting antenna 104'. Elements in FIG. 13 that are identical to elements shown in FIGS. 1 or 6 are designated by the same numeral followed by a prime symbol.

The antenna 104' is a vertical magnetic dipole antenna, such as a ferrite rod antenna, with the loop of the antenna orientated in the x-z plane. For a ferrite rod antenna, the ferrite rod would run parallel to the drillhole 18' (i.e. parallel to the y axis) and the loops of the wire coil wound around the ferrite rod would lie in the x-z plane.

The receiver antenna 202 is a horizontal magnetic dipole antenna having the antenna loop lying in the y-z plane. Thus, the loops of the antennas 104' and 202 are orthogonal to each other. This orthogonal orientation has the effect of cancelling or suppressing reception at the receiver antenna 202 of a primary wave 206 emitted by the transmitting antenna 104'.

The electromotive force (emf) induced in the receiver antenna 202 is given by equation (3), supra.

The magnetic field components for the primary wave 206 are given by equations (4) and (5) discussed in relation to FIG. 7. Since neither $H_0$ nor $H_r$ thread the loop of the receiver antenna 202 by the primary wave 206. In contrast, a scattered wave 210, produced by the conductor 14', is a cylindrical spreading wave that has a magnetic field component $H_s$ that threads the loop of the receiver antenna 202. Thus, the scattered wave 210 induces emf in the receiver antenna 202, allowing detection of the scattered wave 210.

The use of orthogonal transmitting and receiving antennas to allow reception of the scattered wave 202 while discriminating against the primary wave 206 is used, preferably, with methods III and V discussed in relation to FIG. 8 and FIG. 10.

Figure 14:
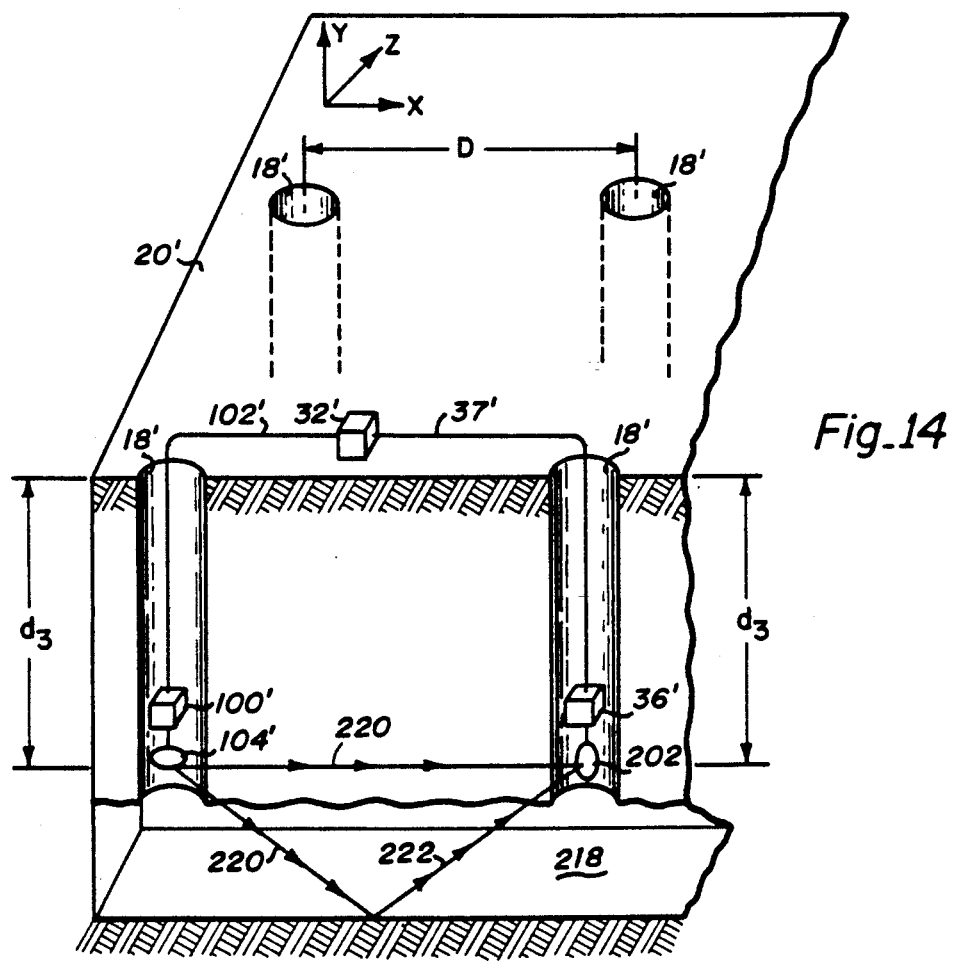
FIG. 14 shows a system for detecting the scattered wave from a conductive surface according to the present invention.

FIG. 14 shows that the orthogonal antenna arrangement of FIG. 13 can also be used to detect a conducting surface 218 such as a rock mass (i.e. a "stringer" or a "skan") or a coal seam. Typically, the rock mass is a magmatic sulfide injection in the host rock. A primary wave 220, emitted by the transmitter antenna 104', is reflected off the conducting surface 218 as a scattered wave 222. Because the plane containing the loop of the transmitter antenna 104', e.g. the coils of a ferrite rod antenna) are orthogonal to the plane containing the loop of the receiver antenna 202, only the magnetic field component of the scattered wave 222 threads the loop of receiver antenna 202. Therefore, only the scattered wave 222 is detected.

FIG. 15 shows a block diagram of a calibrated underground conductor detection system 230 comprising the frequency source unit 32', a downhole transmitter 234 and a downhole receiver 238. The system 230 is designed for use with methods II, III or V illustrated in FIGS. 6, 8 and 10, respectively. The downhole transmitter 234 replaces the transmitter 100 (or 100') and the downhole receiver 238 replaces the receiver 36 (or 36').

The frequency source unit 32' directs a synchronized signal $S_{syn}$ (2.5 kHz) to a fiber optic (F.O.) transmitter 242 which converts $S_{syn}$ to a digital waveform (instead of sinusoidal) and is used to modulate the light intensity of a signal transmitted downhole via a fiber optic cable 244 to a fiber optic receiver 246. The output of the receiver 246 is directed to a phase locked loop (PLL) circuit 250 (with a multiplication constant M) whose output is directed to a transmitter 252. The output of the transmitter 252 ($MS_{syn}$) is applied to a tuned vertical magnetic dipole antenna 254 (analogous to antenna 104) such as a ferrite rod antenna. Current flowing through a sensing resistor 256, connected to the antenna 254, produces a voltage $e_a$ which is converted to a D.C. voltage that is used to control the magnitude of the signal emitted by the transmitter 252 by means of a feedback system 258.

The feedback system 258 comprises an amplitude detector 260, a phase detector 262, an amplifier output level control circuit 264, a microcomputer 266 and an analog-to-digital (A/D) converter 268. The phase detector 262 compares the output phase of the PLL circuit 250 with the phase of the current (I) flowing through resistor 256. The amplitude detector 260 and the level control circuit 264 insure that the current I is maintained at a constant level. The measured value and phase of current I are converted (encoded) to a digital format signal and sent to a fiber optic transmitter 270 and then up a fiber optic cable 271 to a fiber optic receiver 272. The output of the F.O. receiver is directed to the frequency source control unit 32' where the digital format signal is decoded. The microcomputer 72 operates an LCD display to indicate the magnitude and phase of the antenna current for calibration purposes.

The downhole receiver 238 functions analogously to the receiver 36' to receive the magnetic field component $H_0$ of $EM_2$ as previously described with respect to methods I-IV. However, the downhole receiver 238 includes a calibration antenna 274 which may be an untuned broadband circuit such as a long wire or an untuned loop or rod antenna.

A synchronized signal $S_{syn}$, having a frequency $f_{syn}$ (e.g. 10 kHz) is generated by the frequency source unit 32', converted to a fast rise time digital signal and applied to a fiber optic transmitter 276. The digital signal $S_{syn}$ is sent downhole via a fiber optic cable 277 to a fiber optic receiver 278. After processing in a state machine 280, the signal $S_{syn}$ (2.5 kHz) is applied to a PLL circuit 281, with an "M" multiplication constant, to yield a signal $Mf_{syn}$ which has the same frequency as the downhole transmitter 234. The signal $Mf_{syn}$ is applied to the calibrating antenna 274 which radiates the signal $Mf_{syn}$ to a receiving antenna 283. The receiving antenna 283 is a tuned magnetic dipole antenna, analogous to the antenna 41 (and 41'), and also receives the signal $EM_2$ radiated by the conductor 14'.

The 10 kHz signal $f_{syn}$ is also directed to a PLL circuit 285 where it is multiplied by a constant factor N yielding a signal $Nf_{syn}$. The signal $Mf_{syn}$, as received at antenna 283 and the signal $Nf_{syn}$ are mixed in a mixer 287 to produce a mixer output signal called an intermediate frequency (IF) signal at the frequency $S_{syn}$. An amplifier 289 and an attenuator 291 are positioned between the mixer 287 and the antenna 283. The IF signal $S_{syn}$ is sent uphole to the frequency source unit 32' via the pathway that includes a filter 292, an IF amplifier 293, a fiber optic transmitter 294, a fiber optic cable 295 and a filter optic receiver 296. A microcomputer 297 and an analog-to-digital (A/D) converter 298 are connected between the F.O. receiver 278 and the F.O. transmitter 294. The A/D converter 298 is used to measure the magnitude of the IF signal and, via the microcomputer 297, automatically adjusts the attenuator 291.

Use of the downhole receiver 238 allows the source unit 32' to establish the magnitude and phase of the receiver transfer function from the antenna 283 to the frequency source unit 32'.

The functioning of the calibrated underground conductor detection system 230 is as follows. As the antennas 254 and 283 descend in the drillhole 18', mineralized layers such as brine or sulfide ore zones detune the antenna circuits. The detuning causes changes in the current I flowing through the antenna 254 (and resistor 256) to occur.

The calibration system 230 permits the downhole transmitter 234 and the downhole receiver 238 to be calibrated to compensate for these detuning effects by the mineralized layers. The location of the mineralized layers can also be mapped by measuring the depth of the instruments where detuning occurs.

FIG. 16 shows a receiving system configuration, represented by the general reference numeral 300, for using a surface electromagnetic signal 302 to detect the buried conductor 14'. The surface electromagnetic wave 302 could be generated, for example, by a lightning discharge, a radio broadcast transmitter (e.g. the 17.4 kHz transmitter in Japan), a controlled source audio frequency magnetotelluric (CSAMT) transmission, or a high power navigation transmitter.

The system 300 illustrated in FIG. 16 is similar to the system shown in FIG. 9. Elements in FIG. 16 that are identical to elements in FIG. 9 are represented by the same numeral.

A surface receiver 303 and an antenna 304 are utilized to receive the signal 302 propagating in the earth ionosphere waveguide. For example, there is a large radio transmitter in Japan that transmits a 17.4 kHz signal that is detectable in Korea. The receiver 303 is connected to the source unit 32' by a fiber optic cable 305. The received signal 302 is mixed in the receiver 303 with the 2.5 kHz synchronization signal generated by the frequency source unit 32' to yield a signal $f_{If}$. The signal $f_{If}$ is sent to a downhole receiver 306 via a fiber optic cable 308. The fiber optic cable 308 is nonconductive preventing the signal 302 from propagating down the cable to the downhole receiver 306. It should be noted that systems using conductive wire line cable to lower instrumentation into boreholes cannot be successfully used in tunnel detection. The conductive wire can transmit radio signals or magnetotelluric signals to the downhole receiving antenna. Similarly, signals such as power line harmonic signals can also propagate down the cable to the downhole receiver 306. These unwanted waves and signals interfere with the tunnel location process.

The downhole receiver 306 includes a receiving antenna 312 for receiving the radiated waves from the conductor 14' as described in relation to FIG. 9 and method IV.

FIG. 17 illustrates the electrical components of the surface receiver 303 and the downhole receiver 306 in more detail. The antenna 304 is connected to an attenuator 314 which is connected to a radio frequency (RF) amplifier 316 which is connected to a mixer 318.

The 2.5 kHz synchronized signal from the frequency source unit 32' is inputted into the mixer 318. The output of the mixer 318 is filtered through a bandpass filter 320 and amplified by an IF amplifier 322. A microcomputer 324 is connected to the attenuator 314 and to the frequency source unit 32'. The output from the IF amplifier 322 is directed to a fiber optic transmitter 328 and the resulting light output is directed down the fiber optic cable 308 to the downhole receiver 306.

In operation, the mixer 318 always transposes the signal received by the antenna 292 to an intermediate frequency (IF) that is 2.5 kHz below the received signal frequency. The IF signal is then amplified (limited) by the amplifier 322 and converted to a digital signal that modulates the light intensity of the fiber optic transmitter 328. The bandpass filter 320 must be returned to each IF signal frequency. The microcomputer 324 automatically adjusts the attenuator 314 in response to the IF signal level at the F.O. transmitter 328. The microcomputer 324 also uses serial data transmission to communicate with the frequency source unit 32'.

The downhole receiver 306 includes a fiber optic receiver (a light-to-analog converter) 332 whose output is directd to a mixer 334. The antenna 312 is connected to an RF amplifier 336 whose output is directed to the mixer 334. The output of the mixer 334 is filtered through a filter 338 and amplified by an IF amplifier 340. The output of the IF amplifier is directed to a fiber optic transmitter 342 whose light output is sent up the fiber optic cable 37' to a fiber optic receiver 344 and then to the frequency source unit 32'.

The method of using the system 300 can now be explained. The surface signal 302 produces a received signal $S_R$ at the antenna 304 represented by equation (17).

$$S_R = A \sin [2\pi f_o t + 0_f(t)] \quad (17)$$

where A = the magnitude of signal 302;
$f_o$ = the frequency of signal 302; and
$0_f(t)$ = the phase of signal 302 which may be modulated.

The source unit 32' produces a synchronization signal $S_{syn}$ of the form represented by equation (18):

$$S_{syn} = B \sin (2\pi f_{syn} t + 0_2) \quad (18)$$

where $f_{syn}$ = the frequency of $S_{syn}$; and
$0_2$ = phase of $S_{syn}$.

The mixer 318 mixes $S_R$ with $S_{syn}$ to yield an intermediate signal ($S_{IF}$) represented by equation (19):

$$S_{IF} = C \sin (2\pi [f_o - f_{syn}] t + 0_f(t) - 0_2) \quad (19)$$

The signal $S_{IF}$ is applied to the bandpass filter 320 which suppresses the $S_{syn}$ and $S_R$ signals. The filtered $S_{IF}$ signal is applied to the F.O. transmitter 328 for light intensity modulation transmission to the mixer 334.

The surface electromagnetic signal 302 induces current flow in the conductor 14' in the following manner. The surface signal 302 is transmitted long distances by the waveguide formed by the surface of the earth and the ionosphere. The surface signal 302 has a vertical electric field component $E_z$ that is vertically polarized in the waveguide and a horizontal electric field component $E_m$ and a horizontal magnetic field component $H_y$ that are horizontally polarized in the waveguide.

The horizontal components $E_m$ and $H_y$ propagate into the earth where the electric field component $E_m$ can couple with the conductor 14' and induce current flow in the conductor 14'. The current flow in the conductor 14' initiates secondary wave propagation in the rock layer 12' which is detected by the antenna 312 as the signal $S_m$ represented by equation (20):

$$S_m = D \sin [2\pi f_o t + 0_m + 0_f(t)] \quad (20)$$

where $0_m$ = the phase shift accumulated by signal 302 as it propagates from the surface, along the conductor 14' and through rock layer 12' to antenna 312.

In the mixer 334, the signals $S_{IF}$ and $S_m$ are mixed so as to cancel out the term $0_f(t)$ leaving a second IF signal $S_{IF2}$ given by equation (21):

$$S_{IF2} = E \sin (2\pi f_{syn} t + 0_m + 0_2) \quad (21)$$

The signal $S_{IF2}$ is amplified and sent up the fiber optic cable 37' to the frequency source unit 32' where the magnitude and phase of the $S_{IF2}$ signal is determined by the synchronous (autocorrelation) techniques described previously with respect to FIG. 5.

The reason for using the receiving system configuration 300 is that in order to achieve the maximum radius of detection for the conductor 14', the sensitivity of the downhole receiver 306 must be maximized. Ordinarily, this is difficult to achieve because the bandwidth of the receiver 306 must be wide enough to accommodate the occupied bandwidth of the terrestrial radio signal 302. The surface receiver 303 allows a frequency transposition scheme to be utilized which allows the bandwidth of the downhole receiver 306 to be minimized. In summary, the frequency transposition scheme converts the signal received at antenna 312 to a continuous wave (CW) signal that is processed using real time optimum synchronous (autocorrelation) techniques. The advantage of the bandwidth compression obtained by this method is that the noise bandwidth of the downhole receiver is reduced to less than 1 Hz and the receiving sensitivity is less than one nanovolt.

FIG. 18 shows another embodiment of the orthogonal antenna arrangement shown in FIGS. 13 and 14. In FIG. 18, a dual antenna 348 comprising the transmitter antenna 104' and the receiver antenna 202, is located in the drillhole 18'. A motor 350 is connected between the antenna 104' and the antenna 202 for causing the antenna 202 to rotate about the drillhole centerline 354.

The antenna 104' is a ferrite rod antenna, while the antenna 202 is an elongated loop antenna. The antenna 202 is rotated so that it will receive the scattered wave or reflected wave (EM$_2$) emitted from the conductor 14' or conducting surface 218. The transmitter 100' and the receiver 36' are also both located in the drillhole 18' with the dual antenna 348. The dual antenna 348 is of use in applications where, for example, the conductor 14' is an ore deposit or a fault in an oil reservoir.

FIG. 19 illustrates a method for detecting an anomalous geological zone 360. The anomalous geological zone 360 is defined as a region within the rock layer 12' that has different electrical properties than the rock layer 12' (e.g. a tunnel). For convenience, this method is referred to as method VII. Elements of FIG. 19 that are identical to elements described previously are designated by the same reference numeral followed by a prime symbol. Method VII takes advantage of the fact that a low frequency (30–300 kHz) or a medium frequency (300 kHz to 3 MHz) scan of the anomalous geological zone 360 will map conductivity changes due to geologic changes in the rock layer 12'. A second scan done at high frequency (3–30 MHz), very high frequency (30–300 MHz) or ultra high frequency will yield a tomography scan that includes both the geologic background conductivity changes and a diffraction shadow due to the geological zone 360. The geologic noise can then be eliminated from the tomography scan by subtracting the LF/MF scan data from the HF/VHF scan data leaving a tomographic image of the diffraction shadow due to the anomalous geological zone 360.

Typically, in method VII a shadow scattering wave scan technique in the HF/VHF band (described previously with respect to FIG. 8) is used. In method VII, the relative position of the transmitter 100' versus the position of the receiver 36' is varied. For example, the transmitter 100' is positioned in the first drillhole 18' at a position $P_1$ corresponding to a depth $d_1$. The receiver 36' is positioned in the second drillhole 18" at a position $P_{1R}$ corresponding to the depth $d_1$. A first LF or MF signal is then transmitted from the transmitter 100' to the receiver 36' and conveyed up the fiber optic cable 37' for processing in the source unit 32'.

The transmitter 100' is then moved to a position $P_2$ corresponding to a depth $d_2$ and a second LF or MF signal is transmitted from the transmitter 100' to the receiver 36' which is still positioned at $P_{1R}$. This procedure is repeated until the transmitter 100' has been positioned at each of the $P_n$ transmitter positions (generally n=10-25). The receiver 36' is then moved to a second receiver position $P_{2R}$, corresponding to the depth $d_2$, and the entire scanning process is repeated by moving the transmitter 100' to each of the $P_n$ transmitter positions while th receiver 36' remains fixed at the receiver position $P_{2R}$. The process is continued until the receiver 36' has been moved to each of the $P_{nR}$ receiver positions. This process generates a plurality of ray paths 364 where the number of ray paths 364 is equal to $n^2$.

The entire scanning process is then repeated using an HF/VHF transmitter and receiver to generate an HF/VHF data set. The HF/VHF data set is generated by positioning the HF/VHF transmitter and receiver at each of the positions $P_n$ or $P_{nR}$, respectively, and transmitting HF/VHF signal over each of the $n^2$ ray paths 364.

In the tomographic process, the image plane between the drillholes 18' and 18" is divided into a plurality of cells or pixels. For example, horizontal lines are drawn from points midway between the $P_n$ transmitter positions. Equally spaced vertical lines are then drawn perpendicular to the horizontal lines to form the plurality of pixels. Since the ray path distance through each pixel is known, an average parameter value, such as the attenuation rate or phase shift, in each pixel can be determined by processing measured data in an iterative image reconstruction algorithm. The image of the anomalous zone 360 is graphically reconstructed by contouring the pixel attenuation rate and phase values.

In the LF and MF bands, conduction currents predominate in the rock mass. The attenuation rate and phase constants are proportional to the half power of the electrical conductivity of the rock mass and the frequency of the wave. CW tomography images map contours of constant attentuation rate or phase across the image plane. The general shape of the anomalous geologic zone 360 appears in the contouring of the reconstructed pixel values. The change in the primary wave depends upon the path length and the change in conductivity in the rock mass.

In the LF and MF bands, the wavelength in the rock mass is oftentimes greater than the anomalous zone. The high attentuation rate and low scattering cross section combine to create negligible secondary waves. The scattering Fresnel ellipsoid surface (radiating and receiving antenna located at the foci points) resemble narrow pencil beams in slightly conducting rock mass. The narrow beam gives rise to the ray path notion used in the iterative reconstruction of RIM tomographic images.

In the HF, VHF, and UHF bands, displacement currents predominate in the rock mass. The contours of constant attenuation rate map changes in the first power of conductivity and inverse half power of the dielectric constant across the image plane. The attenuation rate would increase from MF band values to greater values in the HF, VHF, and UHF bands. The increase in attenuation rate can be analytically determined. By subtracting the MF tomographic image of "geologic" noise from the HF, VHF, or UHF images on a pixel by pixel basis, the deterministic "geologic" noise can be substantially removed from the HF, VHF, or UHF image. Thus, in method VII, a typical scanning protocol would be as follows:

1. The receiver 36' is positioned at depth $d_1$;
2. The transmitter 100' is positioned at a plurality of transmitter stations corresponding to the depths $d_1$ through $d_n$ (i.e. at as many positions as are required by the scan. Ten or more points may be measured);
3. At each transmitter station an LF or MF signal is transmitted to the receiver 36' along one of the ray paths 364;
4. The receiver 36' is moved to a new depth (receiver station) and steps 2 and 3 are repeated;
5. Step 4 is repeated until all the depths required by the tomography scan have been sampled;
6. Steps 1-5 are repeated substituting an HF, VHF or UHF signal for the LF/MF signal in step 3; and
7. The data for the LF/MF and the HF/VHF scan are processed in a tomography algorithm. The LF/MF image values are subtracted from the HF/VHF image values on a pixel by pixel basis to remove the geologic noise and enhance the anomalous geological zone diffraction pattern.

In the preferred embodiment of method VII, a 522.5 kHz signal is used as the MF signal and a 15 to 30 MHz signal is used as the HF signal. Also, the receiver antenna 41' may be a vertical magnetic dipole or positioned like the antenna 202 in FIGS. 13 and 14 so as to suppress reception of the primary wave.

The measured data set is processed by an iterative reconstruction algorithm. Dines and Lytle (1979) describe an algorithm that can be used to process the data. Since the Kth ray path distance ($d_{ijk}$) through each pixel is known, the average attenuation rate ($a_{ij}$) in each pixel can be determined from the total loss ($I_{Lkik}$) measured on the Kth path as:

$$L_t = \sum_{i=1}^{I} \sum_{j=1}^{J} a_{ij} d_{ijk}.$$

The iterative process solves K linear equation in IJ unknowns. The average value of $a_{ij}$ is determined from the set of measured path loss values $L_k$. The summation in the above equation is over all values of I and J where $d_{ijk}=0$ in pixels not intersected by the Kth ray path. Because the length and width limitations in a scan, the number of equations is usually insufficient to determine $a_{ij}$ uniquely. And as a result, the set of linear equations is over or under determined. Instead of direct matrix conversion, iterative solutions are used to determine $a_{ij}$. The Algebraic Reconstruction Technique (ART) treats one equation at a time. ART changes the pixel values found processing each ray path data. Simultaneous Iterative Reconstruction Techniques (SIRT) change the pixels after processing all paths.

The iterative process begins with an initial guess of the pixel values (conductivity, attenuation rate, or phase shift). Multiple iterations routinely modify the pixel values until the ray path signals synthetically determined from the pixels is within a few percent of the measured data set. The set of pixel values represents the model of the geologic disturbance zone. A contouring algorithm is used to generate contours of constant pixel value curves across the image plane.

Methods of improving the reconstruction methods have been found and some are under development. The construction routines specify the system coupling factor 20 Log C'. See L. Stolarczyk, U.S. Pat. No. 4,742,305. The 20 Log C' factor and spherical spreading factor are used to determine the path loss ($L_k$). A transmitter-fan ray path data can be graphically constructed to find 20 Log C' and $a_{ij}$. If 20 Log C' is selected to be too high, then the $a_{ij}$ pixel values will be overstated. Oftentimes the conductivity along the drillhole is known and can be included in the vertical edge pixel values. Weighting longer ray paths has also improved the reliability of the reconstructions in some cases.

FIG. 20 shows a fast rise time digital signal waveform 370 used to transfer the synchronization signals to the downhole instruments. Electrical noise adds to the synchronization signals and causes excessive phase jitter in the downhole PLL's 140, 250, 285 and 281 when the synchronization signal has a sinusoidal waveform. The phase jitter problem is minimized when fast rise time synchronization signals are used in the system.

The fast rise time digital signal waveform 360 is used to modulate the light intensity transmitted from a fiber optic transmitter such as the F.O. transmitters 242, 276 or 303.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A method for detecting underground electrical conductors which comprises:
    a. placing a transmitter having a transmitter tuned magnetic dipole antenna in a first drillhole extending into a first region suspected of containing an underground conductor, the transmitter being adapted for transmitting a primary, phase coherent continuous radio wave capable of inducing current flow in said conductor from said transmitter tuned magnetic dipole antenna;
    b. placing a receiver capable of receiving a scattered wave generated by said current flow in said conductor in a second drillhole extending into a second region suspected of containing said underground conductor, the receiver having a receiver tuned loop magnetic dipole antenna oriented to receive said scattered wave and to discriminate against reception of said primary phase coherent continuous radio wave;
    c. transmitting said primary phase coherent radio wave from said transmitter through said tuned magnetic dipole antenna into said first region; and
    d. receiving said scattered wave at said receiver tuned loop magnetic dipole antenna as a received signal.

2. The method of claim 1 wherein,
    said transmitter tuned magnetic dipole antenna comprises a ferrite rod antenna having a transmitter antenna magnetic moment of said ferrite rod antenna oriented parallel to a longitudinal centerline of said first drillhole; and
    said receiver tuned loop antenna has a magnetic moment oriented perpendicular to said transmitter antenna magnetic moment.

3. The method of claim 1 wherein,
    said underground conductor comprises an electrical conductor contained in and extending along a longitudinal length of a tunnel.

4. The method of claim 1 wherein,
    said underground conductor comprises a conducting surface.

5. The method of claim 1 further comprising:
    e. rotating said receiver tuned loop magnetic dipole antenna to a position that favors the reception of said scattered wave.

6. The method of claim 1 further comprising:
    a. calibrating said transmitter and said receiver while said transmitter and said receiver are positioned in said first and said second drillholes to compensate for the effect of detuning of said transmitter tuned magnetic dipole antenna and said receiver tuned loop antenna.

7. The method of claim 6 wherein said calibration of said transmitter includes the steps of:
    a. causing a synchronization signal to be sent from a surface signal generator down said first drillhole over a fiber optic cable to a calibration circuit in said transmitter;
    b. measuring a current flow through said transmitter tuned magnetic dipole antenna and sending the current flow to a feedback control circuit to maintain a constant current flow in said transmitter tuned magnetic dipole antenna; and
    c. sending a signal related to a phase difference between the current flow and the synchronization signal to said surface signal generator.

8. The method of claim 7 wherein,
    the synchronization signal comprises a fast rise time digital waveform.

9. A method for detecting an underground electrical conductor comprises:
    a. positioning a transceiver in a drillhole, the transceiver including a transmitter adapted to transmit a primary electromagnetic signal from a tuned ferrite rod antenna for inducing current flow in an underground electrical conductor, the transceiver further including a receiver adapted to receive a scattered electromagnetic signal at an elongated tuned loop antenna, said scattered wave being generated by the induced current flow in said underground conductor, and a rotation means for rotating said elongated tuned loop antenna;
    b. transmitting said primary electromagnetic signal from said tuned ferrite rod antenna; and
    c. causing said rotation means to rotate said elongated tuned loop antenna to a position where said scattered wave is received by said elongated tuned loop antenna and said primary electromagnetic wave is not received.

* * * * *